United States Patent
Ryon et al.

(10) Patent No.: US 11,719,162 B2
(45) Date of Patent: Aug. 8, 2023

(54) TORCH IGNITER COOLING SYSTEM

(71) Applicant: Delavan Inc., Des Moines, IA (US)

(72) Inventors: Jason Ryon, Carlisle, IA (US); Lev Alexander Prociw, Johnston, IA (US)

(73) Assignee: Delavan, Inc., Des Moines, IA (US)

( * ) Notice: Subject to any disclaimer, the term of this patent is extended or adjusted under 35 U.S.C. 154(b) by 0 days.

(21) Appl. No.: 17/686,911

(22) Filed: Mar. 4, 2022

(65) Prior Publication Data

US 2022/0186669 A1 Jun. 16, 2022

Related U.S. Application Data

(63) Continuation of application No. 17/089,250, filed on Nov. 4, 2020, now Pat. No. 11,473,505.

(51) Int. Cl.
*F02C 7/00* (2006.01)
*F02C 7/264* (2006.01)
(Continued)

(52) U.S. Cl.
CPC .............. *F02C 7/264* (2013.01); *F23D 14/78* (2013.01); *F23R 3/06* (2013.01); *B33Y 80/00* (2014.12); *F05D 2240/35* (2013.01); *F05D 2260/232* (2013.01); *F05D 2260/99* (2013.01); *F23D 2214/00* (2013.01); *F23R 2900/00018* (2013.01)

(58) Field of Classification Search
None
See application file for complete search history.

(56) References Cited

U.S. PATENT DOCUMENTS

| | | |
|---|---|---|
| 2,540,642 A | 2/1951 | Sidney et al. |
| 2,541,900 A | 2/1951 | Williams |
| | (Continued) | |

FOREIGN PATENT DOCUMENTS

| | | |
|---|---|---|
| DE | 1064760 B | 9/1959 |
| DE | 102018214281 B3 | 8/2019 |
| | (Continued) | |

OTHER PUBLICATIONS

Extended European Search Report for EP Application No. 21192156.4, dated Feb. 1, 2022, 7 pages.
(Continued)

*Primary Examiner* — Edwin Kang
(74) *Attorney, Agent, or Firm* — Kinney & Lange, P.A.

(57) ABSTRACT

An embodiment of a torch igniter for a combustor of a gas turbine engine includes a combustion chamber oriented about an axis, a cap defining the axially upstream end of the combustion chamber and situated on the axis, a tip defining the axially downstream end of the combustion chamber, an igniter wall extending from the cap to the tip and defining a radial extent of the combustion chamber, a structural wall coaxial with and surrounding the igniter wall, an outlet passage defined by the igniter wall within the tip, wherein the outlet passage fluidly connects the combustion chamber to the combustor of the gas turbine engine, and a cooling system. The cooling system has an air inlet, a cooling channel, and an aperture. The cooling channel forms a flow path having a first axial section, a second axial section, a radially inward section, and a radially outward section.

19 Claims, 18 Drawing Sheets

(51) Int. Cl.
  *F23D 14/78* (2006.01)
  *F23R 3/06* (2006.01)
  *B33Y 80/00* (2015.01)

(56) References Cited

U.S. PATENT DOCUMENTS

| | | | |
|---|---|---|---|
| 2,645,082 A | 7/1953 | Sarto | |
| 2,648,951 A | 8/1953 | McDougal | |
| 2,734,341 A | 2/1956 | Lovesey | |
| 2,784,553 A | 3/1957 | De et al. | |
| 2,811,676 A | 10/1957 | Beye | |
| 2,840,742 A | 6/1958 | Watters | |
| 2,847,826 A | 8/1958 | Dennis | |
| 2,864,234 A | 12/1958 | Seglem et al. | |
| 2,885,859 A | 5/1959 | Fortunato | |
| 2,958,196 A | 11/1960 | Wie et al. | |
| 2,967,224 A | 1/1961 | Irwin | |
| 3,009,321 A | 11/1961 | Jones et al. | |
| 3,487,636 A | 1/1970 | Vdoviak et al. | |
| 3,558,251 A | 1/1971 | Bauger et al. | |
| 3,690,093 A | 9/1972 | Carlisle | |
| 3,898,797 A | 8/1975 | Wood | |
| 3,954,389 A | 5/1976 | Szetela | |
| 3,990,834 A | 11/1976 | Dubell et al. | |
| 4,012,904 A | 3/1977 | Nogle | |
| 4,099,373 A | 7/1978 | Griffin et al. | |
| 4,112,675 A | 9/1978 | Pillsbury et al. | |
| 4,141,213 A | 2/1979 | Ross | |
| 4,192,139 A | 3/1980 | Buchheim | |
| 4,194,358 A | 3/1980 | Stenger | |
| 4,351,156 A | 9/1982 | White et al. | |
| 4,412,414 A | 11/1983 | Novick et al. | |
| 4,441,323 A | 4/1984 | Colley | |
| 4,828,488 A | 5/1989 | Reiser et al. | |
| 4,860,533 A | 8/1989 | Joshi | |
| 4,912,931 A | 4/1990 | Joshi et al. | |
| 4,915,615 A | 4/1990 | Kawamura et al. | |
| 5,085,040 A | 2/1992 | Tilston | |
| 5,390,855 A | 2/1995 | Mims et al. | |
| 5,469,700 A | 11/1995 | Corbett et al. | |
| 5,499,497 A | 3/1996 | Defreitas | |
| 5,636,511 A | 6/1997 | Pfefferle et al. | |
| 5,640,841 A | 6/1997 | Crosby | |
| 5,673,554 A | 10/1997 | Defreitas et al. | |
| 5,695,328 A | 12/1997 | Defreitas et al. | |
| 5,720,163 A | 2/1998 | Pfefferle et al. | |
| 5,744,206 A | 4/1998 | Russek et al. | |
| 5,845,480 A | 12/1998 | Defreitas et al. | |
| 6,138,654 A | 10/2000 | Pretorius et al. | |
| 6,195,247 B1 | 2/2001 | Cote et al. | |
| 6,240,731 B1 | 6/2001 | Hoke et al. | |
| 6,247,300 B1 | 6/2001 | Muramatsu et al. | |
| 6,483,022 B1 | 11/2002 | Packard | |
| 6,884,967 B1 | 4/2005 | Leigh | |
| 6,915,638 B2 | 7/2005 | Runkle et al. | |
| 6,952,927 B2 | 10/2005 | Howell et al. | |
| 6,968,699 B2 | 11/2005 | Howell et al. | |
| 7,124,724 B2 | 10/2006 | Fleetwood | |
| 7,137,255 B2 | 11/2006 | Schmotolocha et al. | |
| 7,216,488 B2 | 5/2007 | Howell et al. | |
| 7,470,875 B1 | 12/2008 | Wilcox et al. | |
| 7,481,248 B2 | 1/2009 | Prociw et al. | |
| 7,637,094 B2 | 12/2009 | Costello et al. | |
| 8,365,710 B2 | 2/2013 | Lykowski et al. | |
| 8,713,944 B2 | 5/2014 | Bleeker | |
| 9,080,772 B2 | 7/2015 | Prociw et al. | |
| 9,135,755 B2 | 9/2015 | Youssef | |
| 9,279,398 B2 | 3/2016 | McAlister | |
| 9,413,141 B2 | 8/2016 | Leglaye et al. | |
| 9,453,491 B2 | 9/2016 | Tanaka et al. | |
| 9,476,399 B1 | 10/2016 | Munson | |
| 9,567,912 B2 | 2/2017 | Prociw et al. | |
| 10,041,859 B2 | 8/2018 | Desilva et al. | |
| 10,156,189 B2 | 12/2018 | Sze et al. | |
| 10,488,047 B2 | 11/2019 | Ott et al. | |
| 10,584,639 B2 | 3/2020 | Dam et al. | |
| 10,711,699 B2 | 7/2020 | Dam et al. | |
| 10,823,398 B2 | 11/2020 | Choudhri et al. | |
| 11,209,164 B1 | 12/2021 | Ryon et al. | |
| 11,226,103 B1 | 1/2022 | Ryon et al. | |
| 11,255,535 B1 | 2/2022 | Eckert et al. | |
| 11,473,505 B2 * | 10/2022 | Ryon | F23R 3/06 |
| 2002/0050061 A1 | 5/2002 | Komyoji et al. | |
| 2002/0162333 A1 | 11/2002 | Zelina | |
| 2004/0050061 A1 | 3/2004 | Schmotolocha et al. | |
| 2004/0168442 A1 | 9/2004 | Schmotolocha et al. | |
| 2005/0053876 A1 | 3/2005 | Joos et al. | |
| 2005/0166595 A1 | 8/2005 | Fletcher et al. | |
| 2005/0284442 A1 | 12/2005 | Stuttaford et al. | |
| 2006/0054233 A1 | 3/2006 | Prociw et al. | |
| 2006/0168967 A1 | 8/2006 | Simons et al. | |
| 2008/0036209 A1 | 2/2008 | Bulkovitch | |
| 2008/0141651 A1 | 6/2008 | Eason et al. | |
| 2008/0299504 A1 | 12/2008 | Horn | |
| 2009/0234555 A1 | 9/2009 | Williams et al. | |
| 2009/0314000 A1 | 12/2009 | Evulet et al. | |
| 2010/0043444 A1 | 2/2010 | Gross et al. | |
| 2010/0071343 A1 | 3/2010 | Yu | |
| 2010/0126617 A1 | 5/2010 | Stroempl et al. | |
| 2011/0088409 A1 | 4/2011 | Carlisle | |
| 2011/0113787 A1 | 5/2011 | Milosavljevic | |
| 2011/0247341 A1 * | 10/2011 | McMahan | F23R 3/002 |
| | | | 60/757 |
| 2011/0247590 A1 | 10/2011 | Donovan | |
| 2011/0271684 A1 | 11/2011 | Corsmeier et al. | |
| 2012/0085468 A1 | 4/2012 | Walker | |
| 2013/0000323 A1 | 1/2013 | Kupratis | |
| 2013/0040255 A1 | 2/2013 | Shi et al. | |
| 2013/0143171 A1 | 6/2013 | Soda et al. | |
| 2013/0174562 A1 | 7/2013 | Holcomb et al. | |
| 2013/0283800 A1 | 10/2013 | Romig et al. | |
| 2014/0150401 A1 | 6/2014 | Venter | |
| 2014/0215997 A1 | 8/2014 | Lior et al. | |
| 2014/0216384 A1 | 8/2014 | Tanaka et al. | |
| 2014/0260304 A1 | 9/2014 | Cummings et al. | |
| 2014/0290259 A1 | 10/2014 | Plante et al. | |
| 2014/0314548 A1 | 10/2014 | Rivers et al. | |
| 2014/0366505 A1 * | 12/2014 | Prociw | F02C 7/266 |
| | | | 60/39.821 |
| 2014/0366542 A1 | 12/2014 | Teets | |
| 2014/0366551 A1 | 12/2014 | Prociw et al. | |
| 2015/0036781 A1 | 2/2015 | Youssef | |
| 2015/0040575 A1 | 2/2015 | Martinez Fabre et al. | |
| 2015/0260406 A1 | 9/2015 | Carrere | |
| 2015/0275755 A1 | 10/2015 | Ogata et al. | |
| 2015/0275769 A1 | 10/2015 | Foutch et al. | |
| 2015/0308351 A1 | 10/2015 | Sheridan | |
| 2015/0345426 A1 | 12/2015 | Houston et al. | |
| 2015/0345788 A1 | 12/2015 | Miyata et al. | |
| 2015/0354517 A1 | 12/2015 | Mansour et al. | |
| 2016/0003150 A1 | 1/2016 | Dicintio et al. | |
| 2016/0010559 A1 | 1/2016 | Hoke et al. | |
| 2016/0047318 A1 | 2/2016 | Dam et al. | |
| 2016/0084169 A1 | 3/2016 | Stuttaford et al. | |
| 2016/0169110 A1 | 6/2016 | Myers et al. | |
| 2016/0230993 A1 | 8/2016 | Dai et al. | |
| 2017/0082022 A1 | 3/2017 | Lee | |
| 2017/0138266 A1 | 5/2017 | Caples | |
| 2017/0145852 A1 | 5/2017 | McCune et al. | |
| 2017/0284298 A1 | 10/2017 | Suciu et al. | |
| 2017/0298822 A1 | 10/2017 | Garde La Casa | |
| 2017/0350590 A1 | 12/2017 | Choudhri et al. | |
| 2017/0356656 A1 | 12/2017 | Ogata et al. | |
| 2018/0003388 A1 | 1/2018 | Park | |
| 2018/0010795 A1 | 1/2018 | Nath et al. | |
| 2018/0051710 A1 | 2/2018 | Takamura et al. | |
| 2018/0058224 A1 | 3/2018 | Jennings et al. | |
| 2018/0058331 A1 | 3/2018 | Barton et al. | |
| 2018/0058404 A1 | 3/2018 | Tibbs | |
| 2018/0100437 A1 | 4/2018 | Dicintio et al. | |
| 2018/0134407 A1 | 5/2018 | Elbibary et al. | |
| 2018/0154446 A1 | 6/2018 | Brown et al. | |
| 2018/0170575 A1 | 6/2018 | Ziarno | |
| 2018/0172271 A1 | 6/2018 | Moniz et al. | |

(56) References Cited

U.S. PATENT DOCUMENTS

| | | | |
|---|---|---|---|
| 2018/0179896 A1 | 6/2018 | Pal et al. | |
| 2018/0179956 A1 | 6/2018 | Wertz | |
| 2018/0283692 A1 | 10/2018 | Ryon et al. | |
| 2018/0356095 A1 | 12/2018 | Patel et al. | |
| 2018/0363555 A1 | 12/2018 | Zelina et al. | |
| 2019/0010872 A1* | 1/2019 | Dam | F23R 3/14 |
| 2019/0024897 A1 | 1/2019 | Prociw et al. | |
| 2019/0032561 A1 | 1/2019 | Stoia et al. | |
| 2019/0178497 A1 | 6/2019 | Jones et al. | |
| 2019/0249877 A1 | 8/2019 | Fryer | |
| 2020/0080530 A1 | 3/2020 | Freer et al. | |
| 2020/0088409 A1 | 3/2020 | Greenfield et al. | |
| 2020/0191059 A1 | 6/2020 | Ryon et al. | |
| 2020/0309378 A1 | 10/2020 | Dam et al. | |
| 2020/0348024 A1 | 11/2020 | Hicks | |
| 2021/0215100 A1 | 7/2021 | Head et al. | |
| 2022/0007488 A1 | 1/2022 | Bai et al. | |

FOREIGN PATENT DOCUMENTS

| | | | |
|---|---|---|---|
| EP | 2189720 A1 | 5/2010 | |
| EP | 3128166 A1 | 2/2017 | |
| EP | 2677240 B1 | 4/2020 | |
| FR | 970988 A | 1/1951 | |
| FR | 1218296 A | 5/1960 | |
| GB | 693846 A | 7/1953 | |
| GB | 791990 A | 3/1958 | |
| GB | 819141 A | 8/1959 | |
| GB | 859184 A | 1/1961 | |
| JP | 2015021715 A | 2/2015 | |
| KR | 101279722 B1 | 6/2013 | |

OTHER PUBLICATIONS

"Metal Seal Design Guide—High Performance Engineered Seals and Sealing Systems", from Parker Hannlfin Corporation Composite Sealing Systems Division, 2016, 106 pages.

Database WPI—2017 Clarivate Analytics, Week 201919, Thomson Scientific, London GB; AN 2019-17673X XP002806356, 2 pages.

Extended European Search Report for EP Application No. 21215655.8, dated May 2, 2022, 8 pages.

Extended European Search Report for EP Application No. 21215709.3, dated May 12, 2022, 9 pages.

Extended European Search Report for EP Application No. 21216163.2, dated May 16, 2022, 8 pages.

Extended European Search Report for EP Application No. 21209057.5, dated Jul. 19, 2022, 8 pages.

Extended European Search Report for EP Application No. 21205393.8, dated Mar. 17, 2022, 8 pages.

Extended European Search Report for EP Application No. 21201782.6, dated Mar. 28, 2022, 10 pages.

Extended European Search Report for EP Application No. 21205035.5, dated Mar. 28, 2022, 9 pages.

Extended European Search Report for EP Application No. 21214138.6, dated Apr. 25, 2022, 7 pages.

Extended European Search Report for EP Application No. 21214883.7, dated May 13, 2022, pp. 10.

Extended European Search Report for EP Application No. 21212869.8, dated Apr. 28, 2022, pp. 7.

Extended European Search Report for EP Application No. 21213899.4, dated May 6, 2022, 8 pages.

Extended European Search Report for EP Application No. 21214511.4, dated Apr. 29, 2022, 8 pages.

Extended European Search Report for EP Application No. 21214798.7, dated May 11, 2022, 8 pages.

Extended European Search Report for EP Application No. 21214894.4, dated May 3, 2022, 9 pages.

* cited by examiner

TORCH IGNITER COOLING SYSTEM

CROSS-REFERENCE TO RELATED APPLICATION(S)

This application is a continuation of U.S. application Ser. No. 17/089,250 filed Nov. 4, 2020 for "Torch Igniter Cooling System" by J. Ryon and L. Prociw.

BACKGROUND

The present disclosure relates to gas turbine engines and, more particularly, to cooling arrangements suitable for torch igniters used in the combustor section of a gas turbine engine.

Torch igniters can be used in lieu of spark igniters to provide an ignition source for combustors located in gas turbine engines. Torch igniters provide a flame as an ignition source for a combustor rather than the electric current provided by spark igniters. Consequently, torch igniters can provide a larger target for fuel injectors used in a combustor, allowing a greater range of fuel injector designs to be used. However, due to their location in a gas turbine engine, torch igniters can experience temperatures exceeding 3000-4000° F. These high temperature conditions often exceed the thermal limits of materials used in torch igniter construction, negatively impacting the durability of a torch igniter device.

SUMMARY

In one embodiment, the present specification provides a torch igniter for a combustor of a gas turbine engine that includes a combustion chamber oriented about an axis, a cap defining an axially upstream end of the combustion chamber, a tip defining the axially downstream end of the combustion chamber, an igniter wall extending from the cap to the tip and defining a radial extent of the combustion chamber, a structural wall coaxial with and surrounding the igniter wall an outlet passage defined by the igniter wall within the tip, and a cooling system. The upstream and downstream ends of the combustion chamber define a flow direction through the combustion chamber along the axis, the cap is oriented about the axis and is configured to receive a fuel injector and a glow plug, and the outlet passage is fluidly connected to the combustion chamber. The cooling system includes an air inlet, a cooling channel forming a flow path between the igniter wall and the structural wall, and an aperture. The air inlet is formed within the structural wall and configured to intake a flow of air from a compressor section of the gas-turbine engine. The flow path has a first axial section, a second axial section, a radially inward section, and a radially outward section. The first axial section is adjacent to and directly fluidly connected to the air inlet and the radially inward section and is configured to direct the flow of air axially from the air inlet toward the tip. The radially inward section is adjacent to and directly fluidly connected to the first axial section and the radially outward section, and is configured to direct the flow of air toward the interior of the igniter tip. The radially outward section is adjacent to and directly fluidly connected to the second axial section and the radially inward section, and is configured to direct the flow of air toward the exterior of the igniter tip. The second axial section is configured to direct the flow of air toward the cap. The aperture extends transverse to the flow direction through the igniter wall, is adjacent to the second axial section and directly fluidly connects the second axial section to the combustion chamber.

In another embodiment, the present specification provides a method of cooling a torch igniter for a combustor in a gas turbine engine that includes intaking a flow of air from a compressor section of the gas turbine engine, flowing the air through a first axial section of a flow path, flowing the air through a radially inward section of the flow path, flowing the air through a radially outward section of the flow path, flowing the air through a second axial section of the flow path, and flowing the air through an aperture. The air is taken in at an air inlet formed in an exterior of a structural wall at a cap of the torch igniter. The structural wall is coaxial with and surrounds an igniter wall, the igniter wall defines a radial extent of a combustion chamber, a cap defines an axially upstream end of the combustion chamber, a tip defines an axially downstream end of the combustion chamber, and a cooling channel defines a flow path between the structural wall and the igniter wall. The first axial section of the flow path is adjacent to and directly fluidly connected to the air inlet and extends from the cap to the tip. The radially inward section is disposed near the tip and receives air from the first axial section. The radially outward section is disposed near the tip and receives air from the radially inward section. The second axial section directs the flow from the radially outward section toward the cap and extends from the tip to an aperture. The aperture extends through the igniter wall and flows the air into the combustion chamber.

Figure 1:
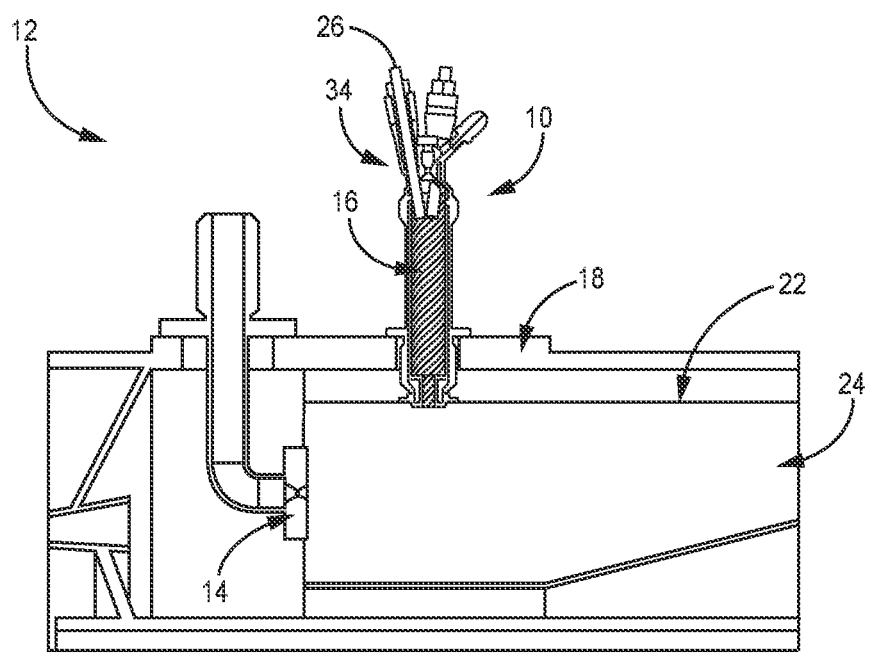
FIG. 1 is a cross-sectional view of an example of torch igniter within the combustion section of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure provides devices and methods for cooling torch igniters within the combustor section of a gas turbine engine. Advantageously, these devices and methods use high-pressure air, such as air exiting the high-pressure section of a gas turbine engine, to cool a torch igniter and subsequently utilize the same high-pressure air for combustion within the torch igniter, preventing potential downstream thermal stress that could result from allowing the cooling air to bypass the combustor section. The cooling schemes of the present invention allow a torch igniter to be constructed from high-temperature metallic components, allowing it to be produced via additive manufacturing.

FIG. 1 is a cross-sectional view of torch igniter 10 disposed within combustor section 12 of a gas turbine engine. Torch igniter 10 can for example be mounted orthogonally to the direction of a fuel spray from fuel injector 14, such that combustion chamber 16 of torch igniter 10 is located outside of high-pressure case 18 and the tip of torch igniter 10 extends through high-pressure case 18 and is mounted through liner 22 of combustor 24. The example of torch igniter 10 in FIG. 1 is shown as having glow plug 26. Glow plug 26 can be used to ignite fuel and create combustion within torch igniter 10, creating a flame within combustion chamber 16. Torch igniter 10 intakes air from an inlet disposed in cap 34 of torch igniter 10. The air may be high-pressure air from the high-pressure section of the gas turbine engine, such as bleed air, or may be air from another location of the gas turbine engine. The air is channeled through cooling channel 28 (depicted in detail in FIG. 2) to cool an igniter wall of combustion chamber 16 before it is channeled into combustion chamber 16 to be used for combustion within torch igniter 10. Combustion chamber 16 is in fluid communication with an internal volume of combustor 24 via an outlet within the tip, allowing the flame created within combustion chamber 16 to reach the interior of combustor 24 and thereby ignite fuel within combustor 24.

Figure 2:
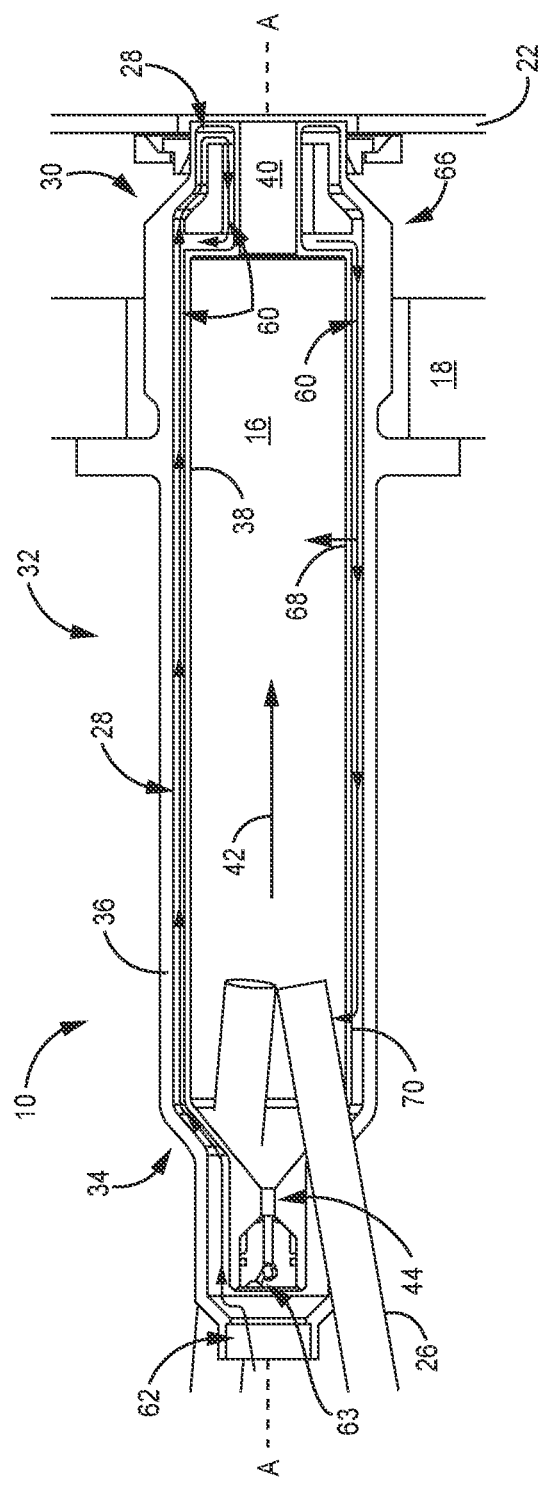
FIG. 2 is cross-sectional view of an example of a cooling arrangement for a torch igniter.

FIG. 2 is a cross-sectional view of torch igniter 10. Torch igniter 10 is composed of tip 30, combustion section 32, and cap 34. Cooling channel 28 is an annular passage embedded within the wall of torch igniter 10, extending between structural wall 36 and igniter wall 38 such that air flowing through cooling channel 28 is able to cool igniter wall 38. Igniter wall 38 surrounds the internal volume of torch igniter 10, which includes combustion chamber 16 and outlet passage 40, such that igniter wall 38 runs from the end of tip 30 to cap 34. Igniter wall 38 may be annular where it surrounds combustion chamber 16 and outlet passage 40, and may be dome- or cone-shaped where it extends adjacent to cap 34. In the depicted example, igniter wall 38 has a larger diameter where it surrounds combustion section 16 than where it surrounds outlet passage 40.

Torch igniter 10 is arranged such that tip 30, combustion section 32, and cap 34 are all oriented coaxially about axis A-A. Arrow 42 shows the general direction of flow for fluids within combustion chamber 16 of torch igniter 10. Thus, torch igniter 10 has upstream and downstream ends oriented along axis A-A and according to the direction of arrow 42. Combustion chamber 16 and outlet passage 40 are fluidly connected such that gases are able to flow from combustion chamber 16 toward tip 30 and to outlet passage 40. Gases are able to exit torch igniter 10 and enter an internal volume of a main combustor, such as combustor 24, via outlet passage 40. To this extent, cap 34 is disposed at the upstream end of torch igniter 10 and tip 30 is disposed at the downstream end of torch igniter 10. It should be understood, however, that tip 30 may be disposed at any suitable location on the downstream end of torch igniter 10, including any location not coaxial with axis A-A.

During operation, torch igniter 10 causes combustion within combustion chamber 16. Hot gases exit torch igniter 10 into a combustor of a gas turbine engine via outlet passage 40. Generally, the portion of torch igniter 10 internal to structural wall 36 is at a higher pressure than the area external to structural wall 36 during operation. Structural wall 36 functions as a pressure vessel and is generally strong enough that it does not deform or leak gases, such as combustion gases or cooling air, under this operational pressure differential. However, the rigidity of structural wall 36 can be negatively affected by the high temperatures of combustion gases produced in combustion chamber 16. Igniter wall 38 acts as a liner to protect the material integrity of structural wall 36 from the heat of combustion in combustion chamber 16. Advantageously, cooling of igniter wall 38 via air circulating through channel 28 allows torch igniter 10 to be constructed from materials with reduced temperature tolerances (e.g., monolithically from a metallic material), including metallic materials useful for additive manufacturing. Likewise, additive manufacturing techniques enable the construction of complex cooling structures, such as cooling fins, within channel 28 to improve cooling of igniter wall 38.

Torch igniter 10 causes combustion within combustion chamber 16 by using fuel injector 44 to inject a fuel-air mixture that impinges on the surface of glow plug 26. Glow plug 26 extends through cap 34, such that it has an internal end and an external end. Further, glow plug 26 can be resistively heated such that it is able to ignite the fuel-air mixture injected by fuel injector 44. Fuel injector 44 generally injects the fuel-air mixture in a conical volume centered on axis A-A that impinges on the internal end of glow plug 26. Fuel injector 44 may be removably connected to an aperture in cap 34 or may be formed integrally to torch igniter 10.

To improve ignition of fuel injected by fuel injector 44, torch igniter 10 can be configured with multiple glow plugs 26 at multiple locations within combustion chamber 16. Further, if the injection pattern of fuel injector 44 is distorted by coking, for example, using multiple glow plugs 26 at multiple locations within combustion chamber 16 can improve the likelihood that the injected fuel impinges on at least one glow plug 26. For example, torch igniter 10 can in some embodiments be equipped with three glow plugs 26 distributed circumferentially, and in some cases symmetrically, about cap 34.

Glow plug 26 is also connected to a power source capable of delivering electric current to the external end of glow plug 26, allowing for the electrically-resistive heating of glow plug 26. In examples where torch igniter 10 contains multiple glow plugs 26, they may be connected to more than one power source or may be connected in series, parallel, or combination arrangement to a single power source. Generally, glow plug 26 is formed of a material capable of being resistively heated. For example, glow plug 26 can be formed of a ceramic material, such as silicon nitride.

Arrows 60 indicate the flow path of high-pressure air through cooling channel 28. Inlet 62 intakes high-pressure air, such as air exiting the high-pressure compressor section, and feeds into channel 28. Channel 28 embedded in cap 34 passes air around fuel injector 44 and channels air toward the section of channel 28 embedded in combustion section 32. A portion of the air is diverted through passage 63 and toward fuel injector 44. Fuel injector 44 uses the diverted air to atomize the fuel that it injects toward glow plug 26. Torch igniter 10 is generally sized to minimize fuel consumption for combustion in combustion chamber 16. Consequently, only a small fraction of air needs to be diverted through passage 63 to atomize the fuel. For example, as low as approximately 1-5% of the total air taken in at inlet 62 can be diverted through passage 63.

The section of channel 28 embedded in combustion section 32 and surrounding combustion chamber 16 is configured with two separate flow paths, the first of which flows air exiting the section of channel 28 embedded in cap 34 axially toward tip 30. At tip 30, air is channeled radially inward toward outlet passage 40, turned to flow axially back toward cap 34, and then turned to flow radially outward at elbow region 66. The second, return flow path of channel 28 along combustion section 32 receives air at elbow region and channels it axially back toward cap 34. The two flow paths generally occupy equal portions of axial channel 28 embedded in combustion section 32. The flow paths are formed in channel 28 by, for example, a wall or fin extending radially through channel 28 from igniter wall 38 to structural wall 36.

Air exits channel 28 via metering hole 68 and air swirl hole 70, both of which are fluidly connected to the return flow path of channel 28. In the depicted example, metering hole 68 is disposed adjacent to and upstream of the aperture through which torch igniter 10 is mounted to high-pressure case 18. Metering hole 68 diverts a portion of air flowing toward air swirl hole 70 and functions to reduce or meter the flow of air flowing through channel 28 to air swirl hole 70, thereby optimizing ignition conditions near fuel injector 44. Air leaving metering hole 68 also facilitates the ignition of any residual fuel leaving combustion chamber 16 and entering outlet passage 40, preventing introduction of unignited fuel in combustor 24. Generally, combustion gases flowing through combustion chamber 16 tend to be hotter at elbow region 66 than in other locations throughout the torch igniter. Further, the narrowing of igniter wall 38 at elbow region 66 causes acceleration of combustion gases through outlet passage 40, resulting in creased convection of hot combustion gases near elbow region 66. This causes greater heat transfer into igniter wall 38 at elbow region 66 than other regions of igniter wall 38. When metering hole 68 is disposed adjacent to the portion of igniter wall 38 in elbow region 66, the air diverted through metering hole 68 can cool gases at elbow region 66 to protect igniter wall 38, thereby increasing the longevity of igniter wall 38.

Elbow region 66 is formed by the difference in the diameter of igniter wall 38 where it surrounds combustion chamber 16 and outlet passage 40. In the depicted example, igniter wall 38 turns approximately 90° at elbow region 66. Consequently, channel 28 extends generally radially through elbow region 66. However, it should be understood that igniter wall 38 can bend at any suitable angle, including non-90° angles.

Due to the diameter difference between the portions of igniter wall 38 that surround combustion chamber 16 and outlet 40, hot gases tend to accumulate along igniter wall 38 in elbow region 66 due to, for example, stagnation. When metering hole 68 is disposed adjacent to the portion of igniter wall 38 in elbow region 66, the air diverted through metering hole 68 can cool gases accumulated in elbow region 66 to protect igniter wall 38, thereby increasing the longevity of igniter wall 38.

The portion of air that is not diverted through metering hole 68 flows through channel 28 embedded in combustion section 32 to the section of channel 28 embedded in cap 34. Channel 28 is connected to air swirl hole 70, which fluidly connects channel 28 to combustion chamber 16. Air entering combustion chamber 16 through air swirl hole 70 is used with the air-fuel mixture injected by fuel injector 44 for combustion within combustion chamber 16. In the depicted example, air swirl hole 70 is positioned upstream of the interior end of glow plug 26 in order to optimize mixing of air entering through air swirl hole 70 with combustion gases inside combustion chamber 16. Air exiting air swirl hole 70 can also be used to prevent buildup of fuel along igniter wall 38 and further to create recirculation zones within combustion chamber 16 suitable for maintaining a self-sustaining flame. It should be understood, however, that air swirl hole 70 may be positioned at any suitable location along combustion chamber 16.

To accommodate multiple flow directions through channel 28, channel 28 can be divided into multiple subchannels configured to channel opposed flows of air, such as the opposed flows of air along combustion section 32. The subchannels can be formed by, for example, fins present in channel 28 that extend from igniter wall 38 to structural wall 36.

As noted above, the configuration of cooling channel 28 allows for air entering at inlet 62 to be used to cool the entirety of igniter wall 38 from cap 34 to tip 30 and to exit channel 28 through metering hole 68 or air swirl hole 70, ultimately flowing into the interior of combustor 24. Advantageously, this configuration prevents downstream thermal stress that could result from allowing the cooling air to bypass the combustor section. Further, this configuration also advantageously allows for regenerative heating of air entering combustion chamber 16 by transferring heat from combustion chamber 16 or other sources to air flowing through channel 28 before using it for combustion in combustion chamber 16. Using heated air for combustion in combustion chamber 16 improve combustion efficiency.

In the depicted embodiment, air swirl hole 70 is positioned upstream of the interior end of glow plugs 26. The depicted position and previously described transverse orientation of air swirl hole 70 allows air exiting air swirl hole 70 to create a recirculation zone within combustion chamber 16. More specifically, the transverse entry of air into combustion chamber 16 creates a low-pressure zone along the centerline of axis A-A and allows for upstream flow of combustion gases along the perimeter of combustion chamber 16. Upstream-flowing combustion gases are heated from the combustion reaction, allowing them to evaporate fuel injected by fuel injector 44 and thereby perpetuate combustion. This allows torch igniter 10 to operate with a self-sustaining flame that does not require continuous resistive heating of glow plugs 26. Rather, in examples where torch igniter 10 can create a self-sustaining flame, glow plugs 26 can be resistively heated only to create an initial ignition of fuel within combustion chamber 16 and then their resistive heating can be stopped. Glow plugs 26 can then remain inactive during continuous operation, with additional air supplied by air swirl hole 70 and fuel supplied by injector 44 perpetuating combustion inside combustion chamber 16.

Generally, torch igniter 10 is configured to operate in high-pressure conditions, such as during the ignition sequence of a gas turbine engine or during takeoff of a gas turbine utilized in an aircraft. However, generating a self-sustaining flame allows torch igniter 10 to operate continuously during the entire operation time of the gas turbine engine in which it is located. Continuous operation allows torch igniter 10 to easily facilitate altitude re-lights of combustor 24 by acting as a pilot light for fuel ignition within combustor 24. However, as will be further explained, combustion chamber 16 has a relatively small size to decrease fuel utilization. Consequently, combustion chamber 16 is not intended to be capable of being re-lit after a blow-out in low pressure-conditions, such as those present at high altitudes.

Advantageously, combustion chamber 16 has a small size suitable to minimize fuel consumption during continuous operation. Limiting the size of torch igniter 10 allows for reduced fuel consumption during takeoff conditions and further can prevent a hot streak of combustion gases from entering combustor 24 and damaging combustor liner 22. Generally, inlet 62 intakes air at a variable rate that depends on engine pressurization and fuel injector 44 injects fuel at a rate that varies proportionally with the rate that air is taken in by inlet 62. For example, during pre-takeoff startup, inlet 62 intakes air at a rate of approximately 10 lbs. per hour. However, during takeoff conditions or continuous operation, inlet 62 can intake air at a rate of approximately 100 lbs. per hour. The amount of fuel injected by fuel injector 44 is selected to provide an appropriate amount of fuel to form a stable air/fuel mixture in combustion chamber 16. Generally, fuel injector 44 supplies fuel at a 1:10 ratio with the air taken in at inlet 62. For example, fuel injector 44 can supply approximately 1 lb. of fuel per hour during pre-takeoff startup and 10 lbs. of fuel per hour during takeoff or continuous operation. However, when air taken in through inlet 62 is sufficiently hot, less fuel may be required for continuous operation. Combustion can be maintained in combustion chamber 16 with approximately 4 lbs. of fuel per hour in these conditions, further minimizing the amount of fuel consumed by torch igniter 10.

Figure 3A:
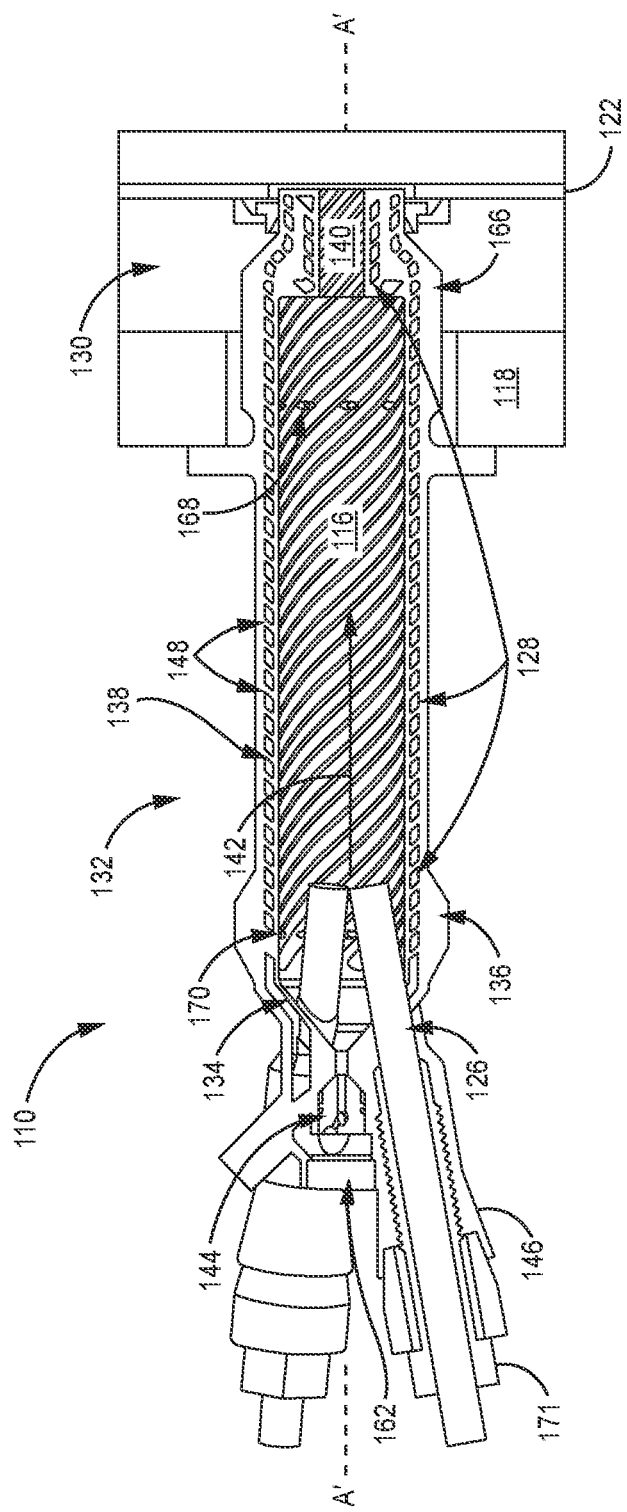
FIG. 3A is a cross-sectional view of an example of a torch igniter.
Figure 3B:
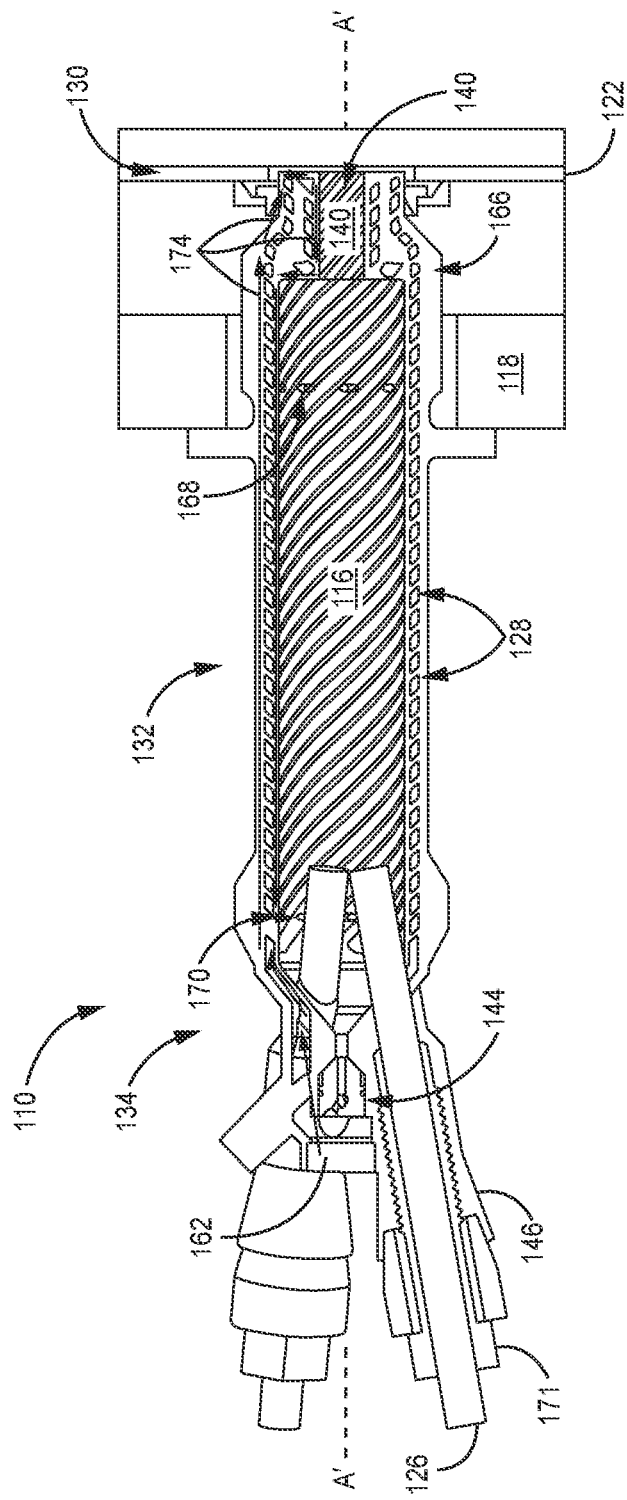
FIG. 3B is a cross-sectional view of an example of a cooling arrangement for the torch igniter of FIG. 3A.

FIGS. 3A-B show cross-sectional views of torch igniter 110, an alternative torch igniter design arranged similarly to torch igniter 10. Torch igniter 110 is mounted to high-pressure case 118 and combustor liner 122, extends along axis A'-A', and includes combustion chamber 116, glow plug 126, channels 128, tip section 130, combustion section 132, and cap section 134. Channels 128 are disposed in and form a flow path through a space between structural wall 136 and igniter wall 138. Igniter wall 138 surrounds and defines combustion chamber 116 and outlet passage 140. Igniter wall 138 is shown as partially transparent in FIGS. 3A-B to illustrate the helical arrangement of channels 128. Arrow 142 indicates the direction of flow through the interior region of torch igniter 110. Fuel injector 144 injects fuel to impinge on glow plug 126, which is mounted through cap section 134 via glow plug housing 146. The structure and function of torch igniter 110 generally parallels that of torch igniter 10, with the further inclusion of fins 148 in channels 128 that extend from igniter wall 138 to structural wall 136. In examples where torch igniter 110 is monolithically formed, fins 148 may connect igniter wall 138 to structural wall 136. Fins 148 are configured to absorb heat from igniter wall 138, increasing the surface area available for cooling igniter wall 138. In examples where fins 148 connect to structural wall 136, they are able to channel a portion of the heat from igniter wall 138 to structural wall 136, allowing structural wall 136 to act as a cooling sink.

Air from within the high-pressure turbine case enters torch igniter 110 via inlet 162 in cap section 134 and along substantially similar flow paths as those present in torch igniter 10. The flow paths through torch igniter 110 are indicated by arrows 174. Specifically, air taken in at inlet 162 travels axially through channels 128 in cap section 134 toward channels 128 in combustion section 132. The section of channels 128 embedded in combustion section 132 has a helical shape and is divided into two flow sections. The first of these flow sections receives air from channels 128 in cap section 134 and flows the air toward tip section 130, while the second flows air in the opposite direction. In the depicted example, channels 128 belonging to each flow section occupy equal portions of axial channels 128 embedded in combustion section 132. However, it should be understood that the two flow sections may occupy unequal portions of channels 128 embedded in combustion section 132. These flow sections allow bidirectional flow of air through channels 128 along combustion section 132 and are arranged in a generally parallel manner, as illustrated in greater detail in FIGS. 4A-4D, 5A-5B, and 6A-6B.

Channels 128 have a radially inward section at the downstream end of tip section 130 which flows air toward the interior of torch igniter 110. An axially-extending helical section embedded in the tip receives air from the radially inward section and routes the air toward elbow section 166. A radially outward section of channels 128 embedded within tip section 130 receives air from the axial section embedded in the tip and flows the air toward the second set of channels of the axially-extending channels 128 embedded in combustion section 132. The second set of channels is fluidly connected to metering holes 168 and air swirl holes 170, and is configured to flow air toward cap section 134. Air exits channels 128 via metering holes 168 and air swirl holes 170.

Generally, metering holes 168 function to meter the flow of air flowing through channels 128 to air swirl holes 170 and thereby optimize ignition conditions near fuel injector 144. In the example depicted in FIGS. 3A-B, metering holes 168 are disposed downstream of the internal ends of glow plug 126. It should be understood that the depicted location of metering holes 168 is merely one position at which metering holes 168 may be located and perform their intended function, and that metering holes 168 may be disposed at any suitable alternative locations.

Similarly, air swirl holes 170 are depicted upstream of the interior end of glow plug 126. The depicted position of air swirl holes 170 to optimize mixing of air entering through air swirl holes 170 with combustion gases inside combustion chamber 116. It should be understood, however, that air swirl holes 170 may be positioned at any point along combustion chamber 16 such that air exiting air swirl hole 170 can be utilized for combustion. Air exiting air swirl hole 170 can also be used to prevent buildup of fuel along igniter wall 38 and further to create recirculation zones within combustion chamber 16 suitable for maintaining a self-sustaining flame, as described previously with respect to air swirl hole 70.

Figure 3C:
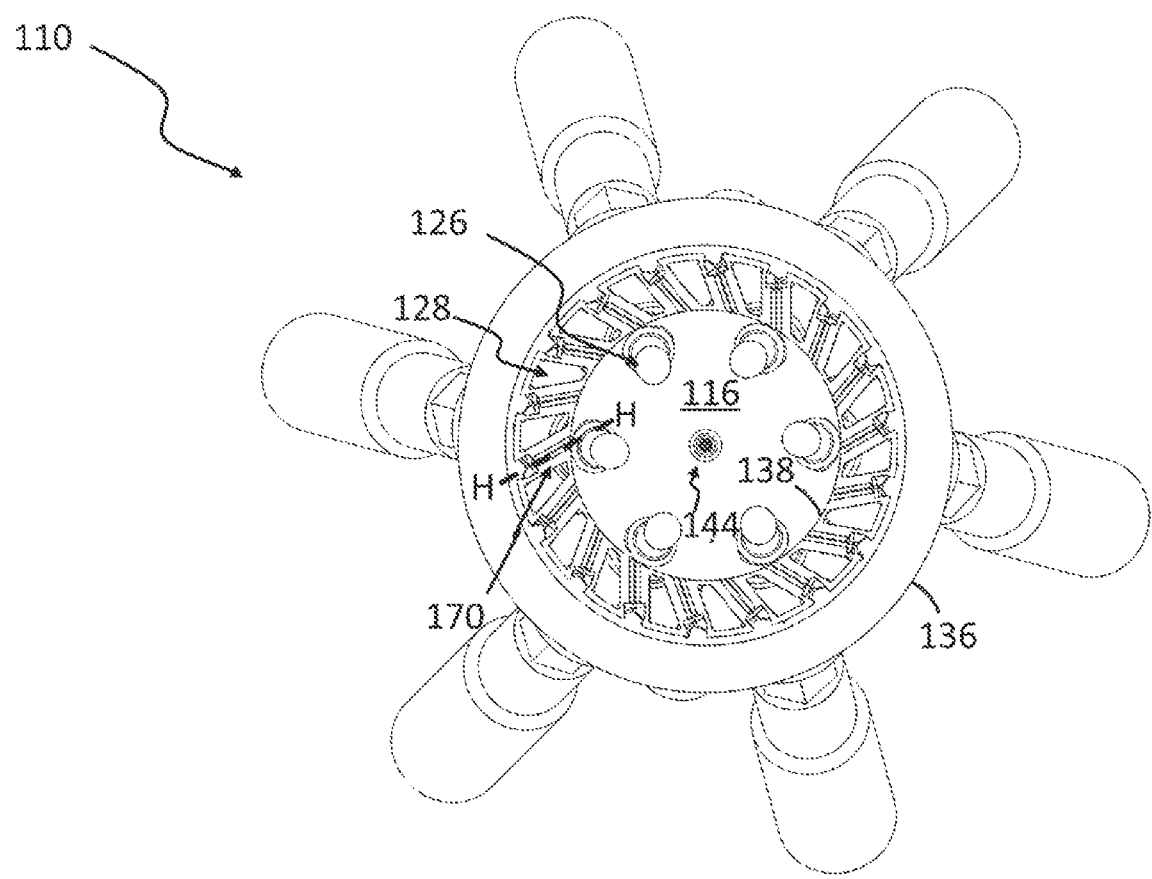
FIG. 3C is a cross-sectional view of the torch igniter shown in FIGS. 3A-B showing orientation of air swirl holes.
Figure 3D:
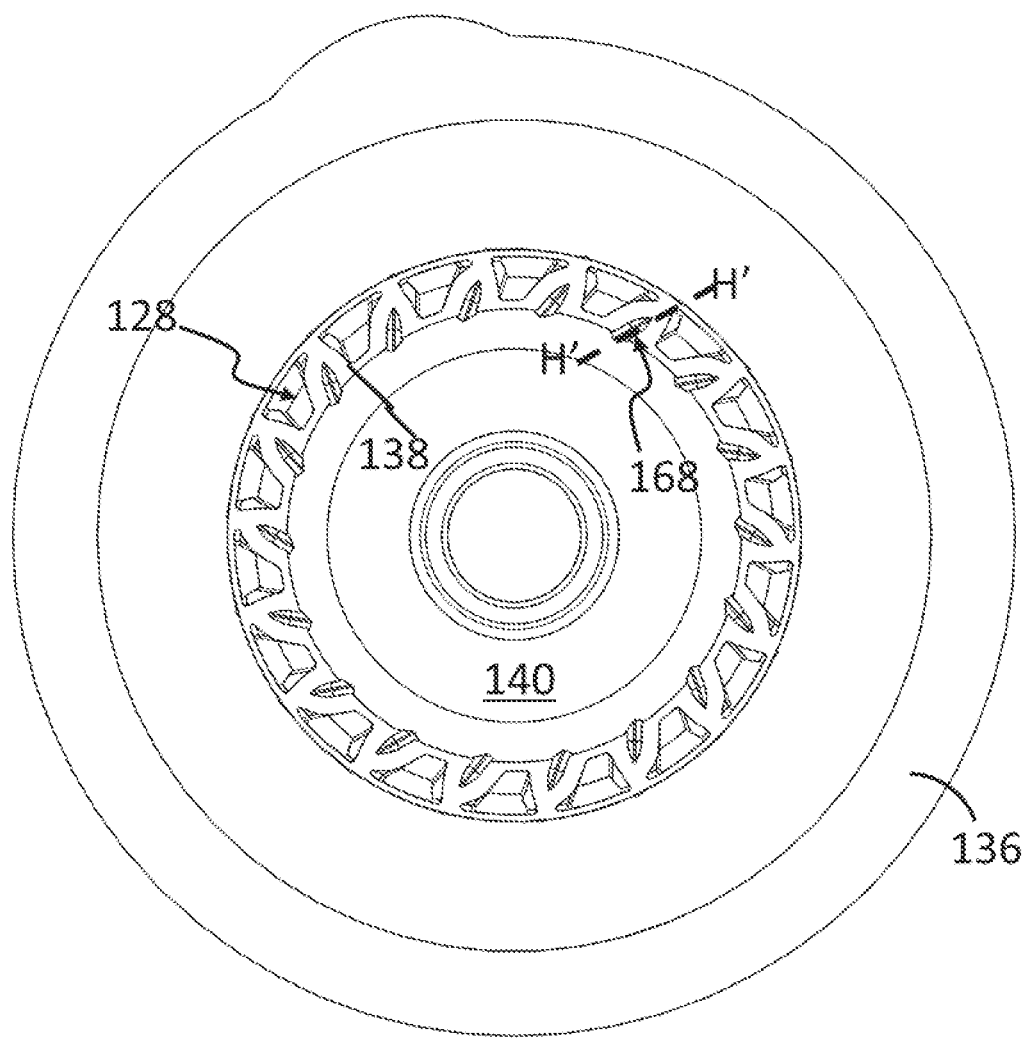
FIG. 3D is a cross-sectional view of the torch igniter shown in FIGS. 3A-B showing orientation of air metering holes.

FIGS. 3C-D show cross-sectional views of torch igniter 110 taken along axis A'-A' that illustrate a canted orientation of metering holes 168 and air swirl holes 170. Canting metering holes 168 or air swirl holes 170 with respect to the inner surface of igniter wall 138 allows metering holes 168 and air swirl holes 170 to act as swirl holes, imparting air exiting metering holes 168 and air swirl holes 170 with a swirl relative to axis A'-A' to improve uniformity of heat distribution in combustion chamber 116. The cross-sectional view shown in FIG. 3C is taken along axis A'-A' between metering holes 168 and air swirl holes 170. FIG. 3C shows the orientation of glow plugs 126, channels 128, fuel injector 144, and air swirl holes 170 relative to combustion chamber 116. Each air swirl hole 170 extends along a hole axis H-H, which is canted with respect to an inner surface of igniter wall 138. As used herein throughout, "canted" indicates that hole axes are angled with respect to a radial orientation of the cross-sectional plane. For simplicity, the connection between air swirl holes 170 and channels 128 is not shown in FIG. 3C, though it should be understood that channels 128 are fluidly connected to air swirl holes 170 as described previously. The cross-sectional view shown in FIG. 3D is taken along axis A'-A' near elbow region 166. FIG. 3D shows the orientation of channels 128 and metering holes 168 relative to outlet passage 140. Each metering hole 168 extends along a hole axis H'-H', which is canted with respect to an inner surface of igniter wall 138. For simplicity, the connection between metering holes 168 and channels 128 is not shown in FIG. 3D, though it should be understood that channels 128 are fluidly connected to metering holes 168 as described previously.

Glow plug 126 is surrounded by and attached to sheath 171, which is removably attached to glow plug housing 146 via a screw attachment. Glow plug housing 146 extends through structural wall 136 and igniter wall 138 of torch igniter 110 and thereby allows glow plug 126 to extend into combustion chamber 116. Glow plug 126 may be non-removably attached to sheath 171 by, for example, brazing or another suitable method. It should be understood that sheath 171 can, in some embodiments, be non-removably attached to glow plug housing 146, glow plug 126 may be removably attached to sheath 171, or glow plug may be attached directly to glow plug housing 146 by removable or nonremovable means.

Notably, the helical sections of channels 128 embedded in tip section 130 and combustion section 132 have radially extending fins that increase the surface area available to cool igniter wall 138 with air from high-pressure case 118.

Figure 4A:
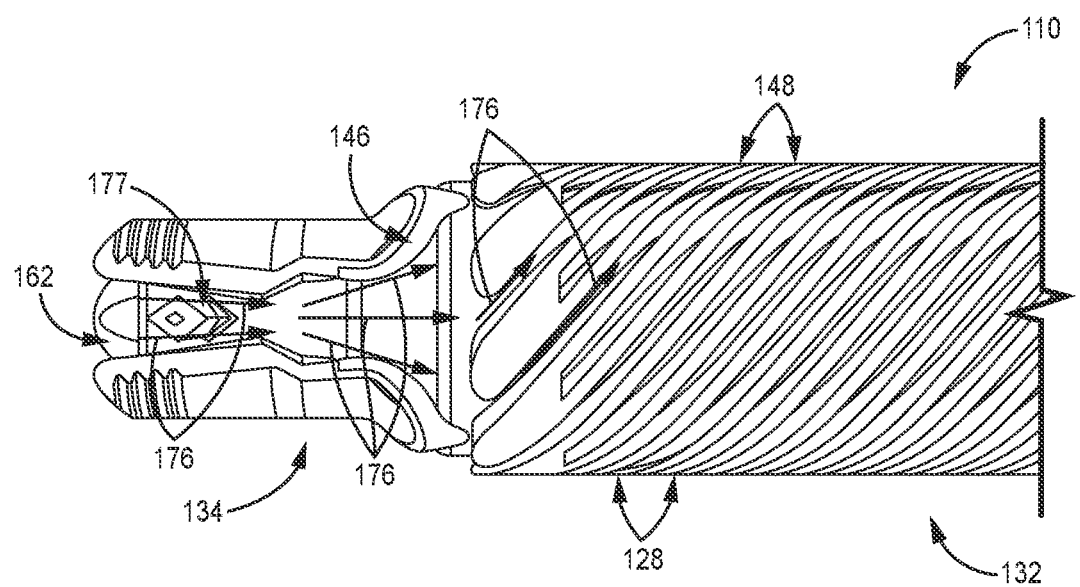
FIG. 4A is a cutaway view of an example of a cooling arrangement for a torch igniter.

FIGS. 4A-D are cutaway views of torch igniter 110 showing the flow path of air through channels 128. FIG. 4A shows the flow path of air through cap section 134, as indicated by arrows 176. Air enters at inlet 162 and travels through cap section 134 toward combustion section 132. Fuel passage 177 extends through the flow path of air in channels 128. Air exiting channels 128 in cap section 134 diverges and is capable of entering more than one of channels 128 in combustion section 134. Channels 128 in combustion section are divided into two of helically-shaped channels separated by fins 148, with one acting as an outbound channel to flow air toward tip section 130 and the other acting as a return channel to flow air back toward cap section 134. The two sets of channels are arranged in a circumferentially alternating manner, such that every other channel of channels 128 forms outbound flow section 178 that carries air exiting cap section 134 toward tip section 130.

Figure 4B:
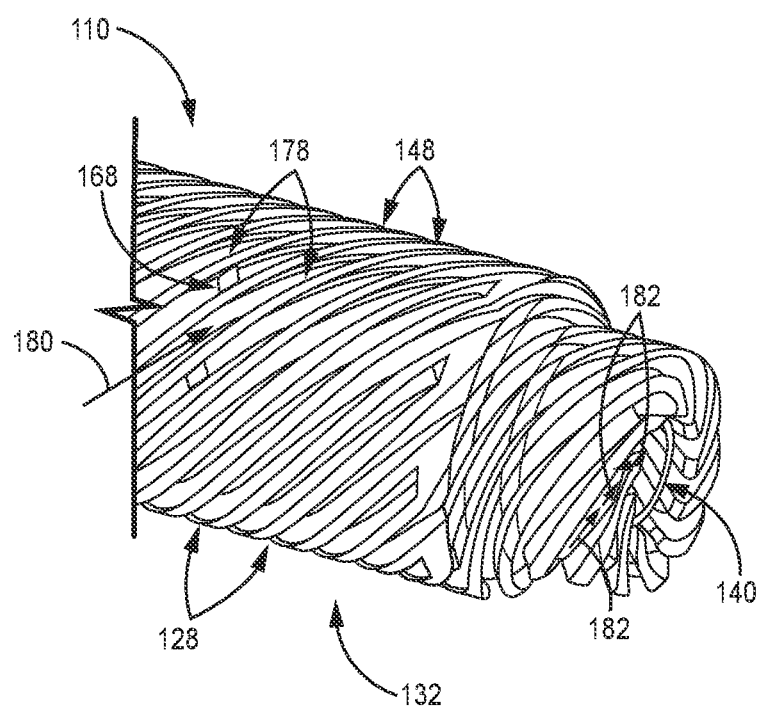
FIG. 4B is a cutaway view of an example of a cooling arrangement for the torch igniter of FIG. 4A, including radial and axial sections.

FIG. 4B shows the flow path of air along combustion section 132 and tip section 130. Air flowing through the axial section of channels 128 embedded in combustion section 132 is received by axially-extending channels embedded in tip section 130, as indicated by flow path arrow 180. Arrows 182 show the flow path of air at the end of tip section 130. Channels 128 conduct air radially inward at the end of tip section 130.

Figure 4C:
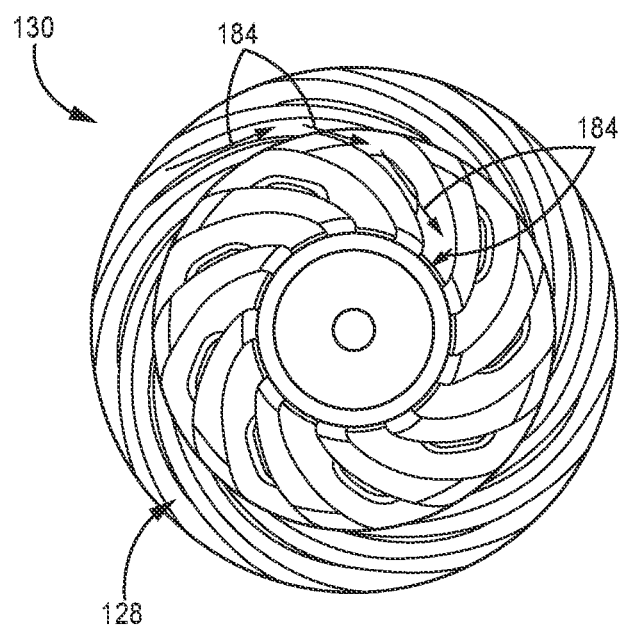
FIG. 4C is a cutaway view of an example of a radial section of a cooling arrangement for the torch igniter of FIG. 4B.
Figure 4D:
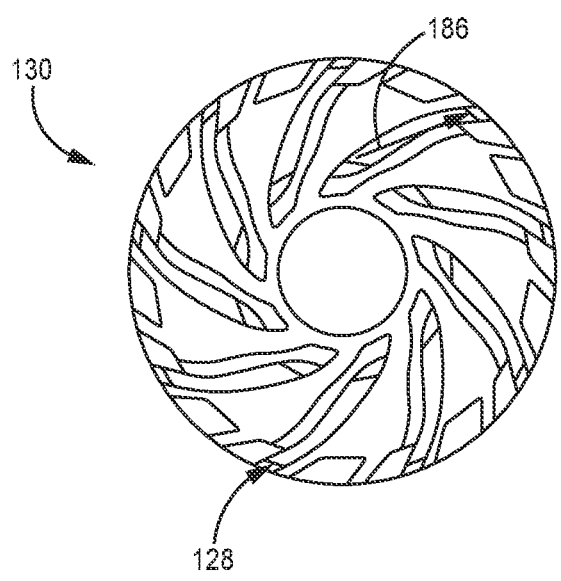
FIG. 4D is a cutaway view of an example of a radial section of a cooling arrangement for the torch igniter of FIG. 4B.

FIG. 4C shows the flow path of air through the radially inward section of channels 128 embedded in tip section 130, as indicated by arrows 184. FIG. 4D shows the flow path of air through the radially outward section of channels 128, as indicated by arrow 186.

Figure 5A:
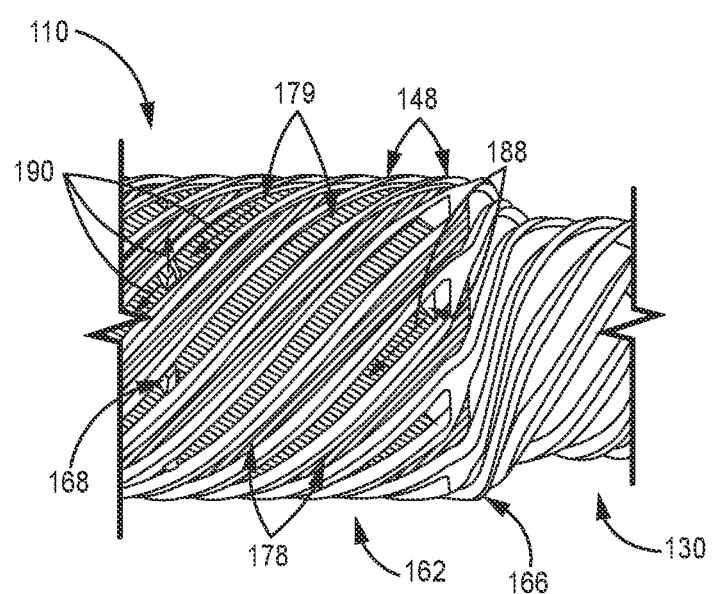
FIG. 5A is a cutaway view of an example of a cooling arrangement for a torch igniter having an air metering hole.
Figure 5B:
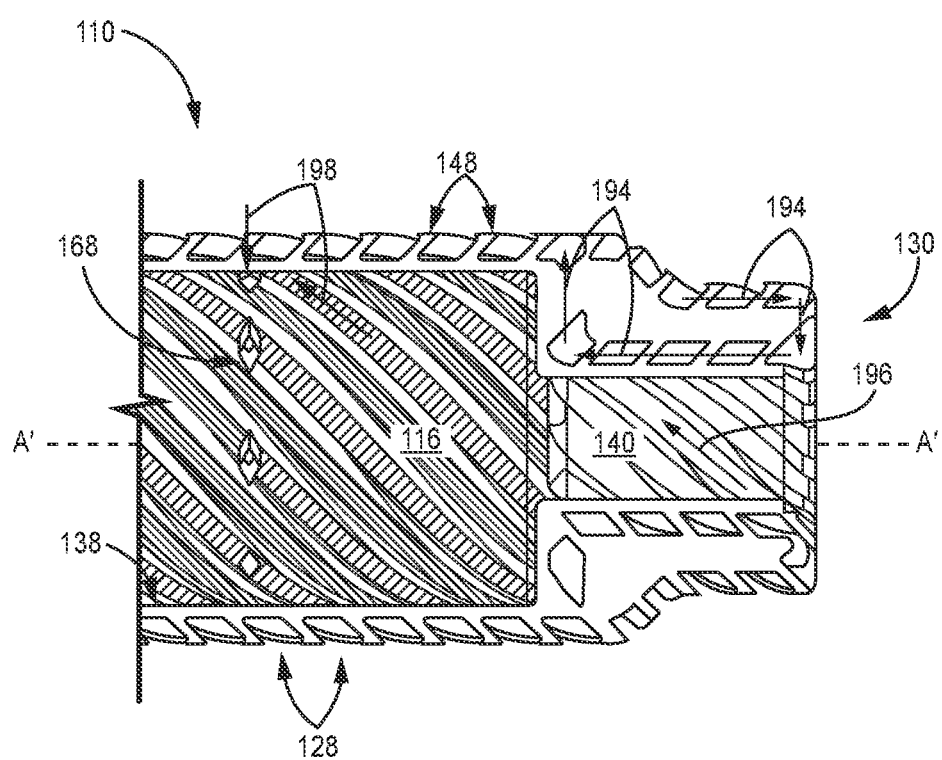
FIG. 5B is a cross-sectional view of an example of a cooling arrangement for the torch igniter having an air metering hole of FIG. 5A.

FIGS. 5A-B show the flow of air through channels 128 into metering holes 168 and air swirl holes 170. FIG. 5A is a cutaway view of torch igniter 10 showing the exit of air from the radially outward section of channels 128 in tip section 130, indicated by arrows 188, and the entry of air into metering holes 168, as indicated by arrows 190. Air flows into return flow section 179 of channels 128 as it exits the radially outward section and travels through return flow section 179 toward metering holes 168, which divert a portion of the air. Channels 128 are arranged such that every other channel of channels 128 forms return flow section 179. To this extent, channels 128 belonging to outbound flow section 178 and return flow section 179 are arranged in an alternating manner, which outbound flow section 178 and return flow section 179 separated by fins 148. This arrangement facilitates the bi-directional flow of air through channels 128 along combustion section 132.

FIG. 5B is a cross-sectional view of torch igniter 110 showing the flow of air through tip section 130 and toward return flow section 179 and metering holes 168. Igniter wall 138 is shown as partially transparent in FIG. 5B to illustrate the helical arrangement of channels 128. Arrows 194 show the flow of air through tip section 130 of torch igniter 110. Air flows through a helical section surrounding outlet passage 140 and coaxial with axis A'-A', and connecting the radially inward and radially outward sections of channels 128. The helical flow of air through channels 128 is illustrated by arrow 196. The radially inward section of channels 128 is disposed at the end of tip section 130, while the radially outward section of channels 128 is disposed adjacent to elbow region 166. After leaving the radially outward section, air flows through return flow section 179 of channels 128 toward metering holes 168, as indicated by arrows 198. Air exiting metering holes 168 enters combustion chamber 116 transversely with respect to both the flow direction and axis A'-A'. Further, metering holes 168 are generally canted with respect to the inner surface of igniter wall 138 such that metering holes 168 act as swirl holes, imparting air exiting metering holes 168 with a swirl relative to axis A'-A' to improve uniformity of heat distribution in combustion chamber 116.

In the depicted example, approximately 50% of air traveling through channel 28 is diverted to metering holes 168 from return flow section 179 of channels 128. However, it should be understood that the amount of air diverted to metering holes 168 can vary depending the percentage of airflow desired to enter combustion chamber 116 through air swirl holes 170.

Figure 6A:
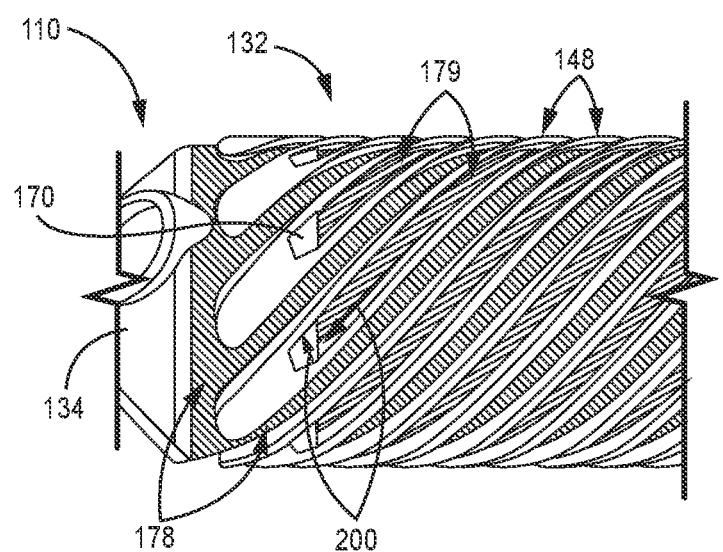
FIG. 6A is a cutaway view of an example of a cooling arrangement for a torch igniter having an air swirl hole.
Figure 6B:
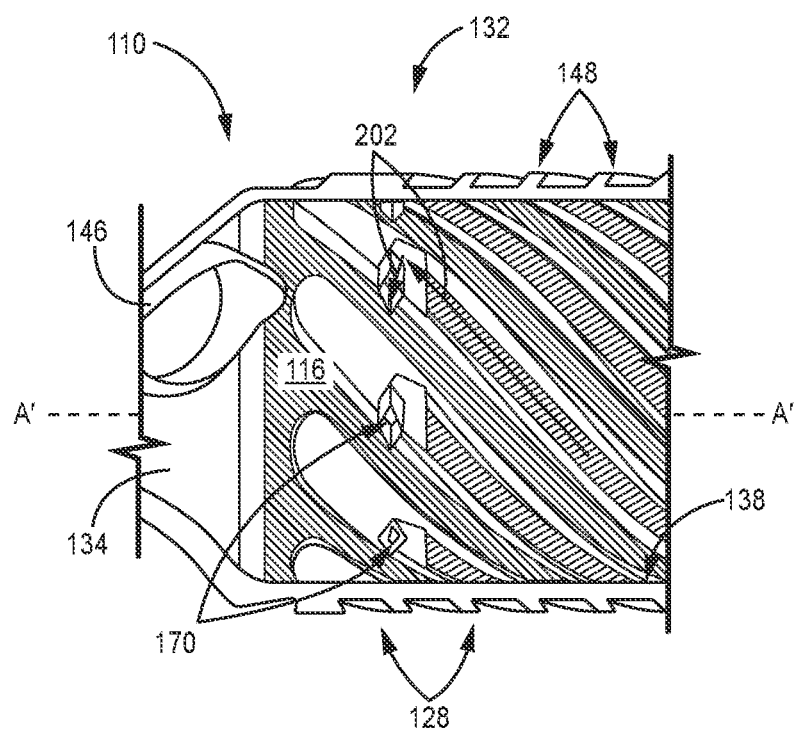
FIG. 6B is a cross-sectional view of an example of a cooling arrangement for the torch igniter having an air swirl hole of FIG. 6A.

FIGS. 6A-B show the flow of air through channels 128 into air swirl holes 170. FIG. 6A is a cutaway view of torch igniter 110 showing the exit of air from return flow section 179 of channels 128 through air swirl holes 170, as indicated by arrows 200. FIG. 6B is a cross-sectional view of torch igniter 110 showing the flow of air through return flow section 179 of channels 128 to air swirl holes 170, as indicated by arrows 202. Igniter wall 138 is shown as partially transparent in FIG. 6B to illustrate the helical arrangement of channels 128. Air flowing through air swirl holes 170 enters combustion section 116. Air exiting air swirl holes 170 enters combustion chamber 116 transversely with respect to both the flow direction and axis A'-A'. Further, air swirl holes 170 are generally canted with respect to the inner surface of igniter wall 138, such that air exiting air swirl holes 170 takes a swirling path through combustion chamber 116, as described above with respect to metering holes 168.

FIGS. 7A-7D depict configurations of temperature-quenching systems that can be used to cool combustion gases leaving a torch igniter. These configurations are especially useful where the tip section of the torch igniter is elongated or takes a curved, non-linear shape and cooling passages in the torch igniter cannot extend through the entire tip region due to geometric or operational constraints.

Figure 7A:
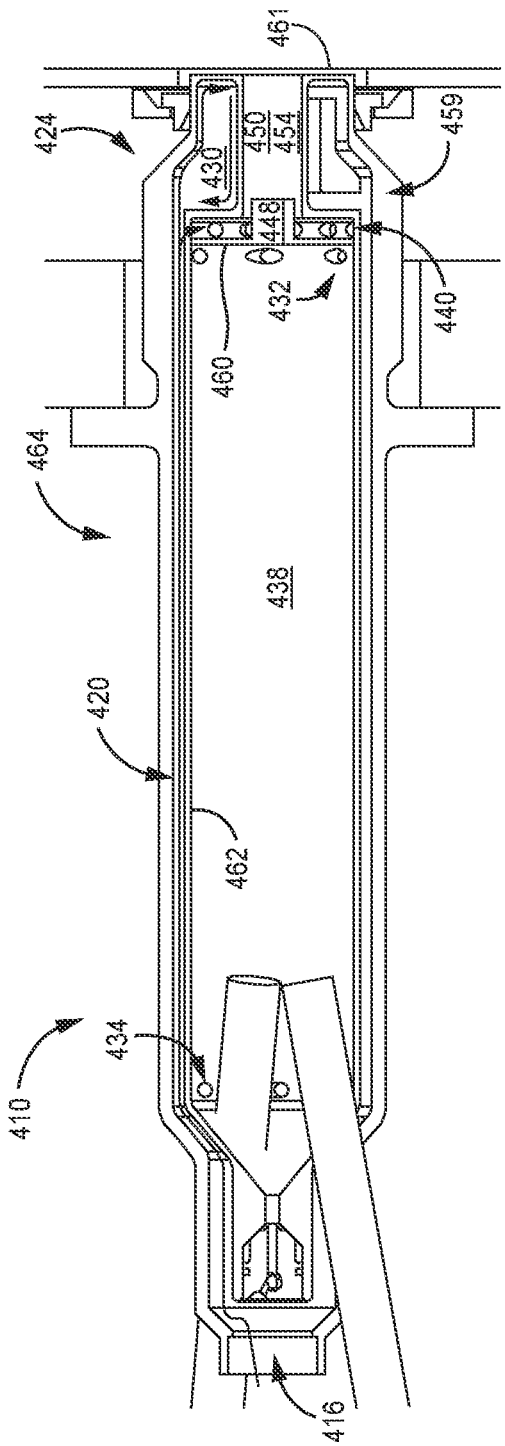
FIG. 7A shows an example of a temperature quenching system for use with a torch igniter.

FIG. 7A shows an example of a temperature quenching system for use with torch igniter 410. Components of torch igniter 410 are arranged similarly to those of torch igniter 10, except for the addition of a temperature quenching system. Air enters torch igniter 410 through inlet 416 and travels through channels 420 toward tip region 424, as indicated by arrows 430. Before air turns in tip region 424 to travel back toward metering holes 432 and air swirl holes 434 and enter combustion chamber 438, a portion of air traveling toward tip region 424 is diverted through quench holes 440. Thus, gases exiting combustion chamber 438 through mixing nozzle 448 are able to mix with air diverted through quench holes 440 in quenching zone 450, which is substantially co-spatial with outlet passage 454. Specifically, quenching zone 450 extends from divider 460 to downstream end 461 of tip region 424 and thereby includes outlet passage 454 as well as the space surrounding mixing nozzle 448 between elbow region 459 and divider 460. Divider 460 functions to separate combustion occurring in combustion chamber 438 from temperature quenching occurring in quenching zone 450. Thus, all gases entering quenching zone 450 from combustion chamber 438 must pass through mixing nozzle 448. Combustion gases leaving quenching zone 450 enter a combustor in a gas turbine engine.

Divider 460 is generally annular and extends from mixing nozzle 448 radially outward to igniter wall 462 in combustion section 464 of torch igniter 410. Quench holes 440 extend through igniter wall 462 in combustion section 464 of torch igniter 410 and are arranged in an annular pattern. In some examples, quench holes 440 may be canted with respect to an inner surface of igniter wall 462. Mixing nozzle 448 is annular and extends generally in the direction of flow through torch igniter 410. Mixing nozzle 448 is shown to have a uniform diameter and extends outward from divider 460 at approximately a 90° angle. However, it should be understood that mixing nozzle 448 can have a non-uniform diameter, can take a non-annular shape, and can extend from divider 460 at any suitable angle.

Up to approximately 50% of airflow through channels 420 can be diverted through quench holes 440 to be used to cool hot combustion gases. To ensure that sufficient air remains to be used to cool torch igniter 410 and be used subsequently for combustion in combustion chamber 438, channels 420 can have substantially larger volume than channel 28 or channels 128, at least in the region of channels 420 connecting inlet 416 to quench holes 440. In these examples, quench holes 440 are preferentially arranged along the flow path through channels 420 before the portion of channels 420 that turn the flow of air in tip region 424 due to design constraints related to the maximum size of channels 420 where they turn the flow of air in tip region 424. Consequently, channels 420 can have a nonuniform annular volume in combustion section 464 and tip region 424, allowing sufficient air to cool the remainder of torch igniter 410 after up to 50% of air taken in at inlet 416 is diverted through quench holes 440 and further ensuring that the portion of channels 420 that turn the flow of air do not exceed any design constraints.

Similarly, to facilitate effective mixing and temperature quenching of within quenching zone 450, outlet passage 454 can be sized to have a substantially larger volume than outlet passage 40 of torch igniter 10 or outlet passage 140 of torch igniter 110. Furthermore, elbow region 459 can be formed at a non-90° angle to expand the area available between divider 460 and elbow region 459 and thereby increase the volume available in quenching zone 450 to mix air flowing through quench holes 440 with hot combustion gases.

Figure 7B:
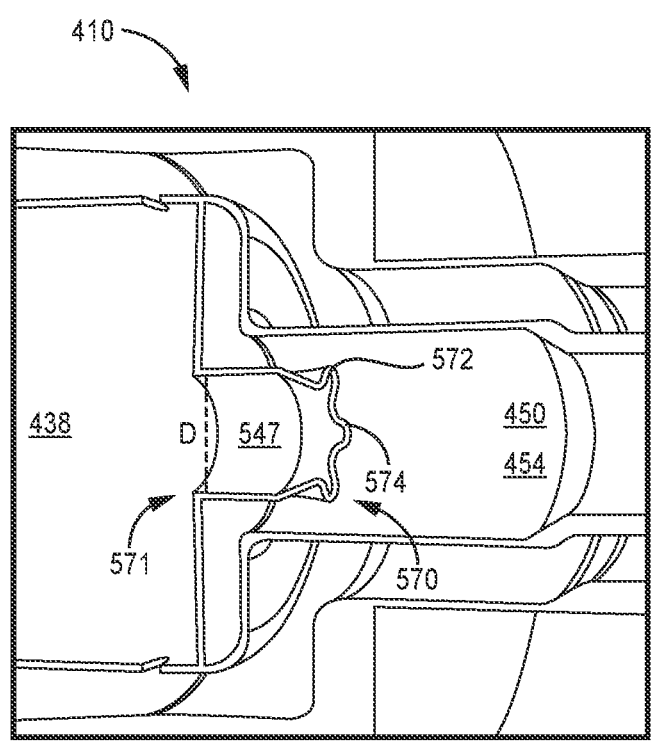
FIG. 7B shows an example of a mixing nozzle for improving mixing in a quenching zone of a torch igniter.

FIG. 7B shows an example of mixing nozzle 548 for improving mixing in quenching zone 450. Mixing nozzle 548 improves mixing within quenching zone 450 by funneling hot combustion gases through a contoured structure having at downstream end 570 of mixing nozzle 448. However, upstream end 571 is still substantially annular and has a diameter D. Downstream end 570 is contoured to have symmetrically-distributed protrusions 572 and indents 574, which are shaped such that the diameter between two diametrically-opposed protrusions 572 is greater than diameter D and the diameter of mixing nozzle 448 between two diametrically-opposed indents 574 is less than diameter D.

Figure 7C:
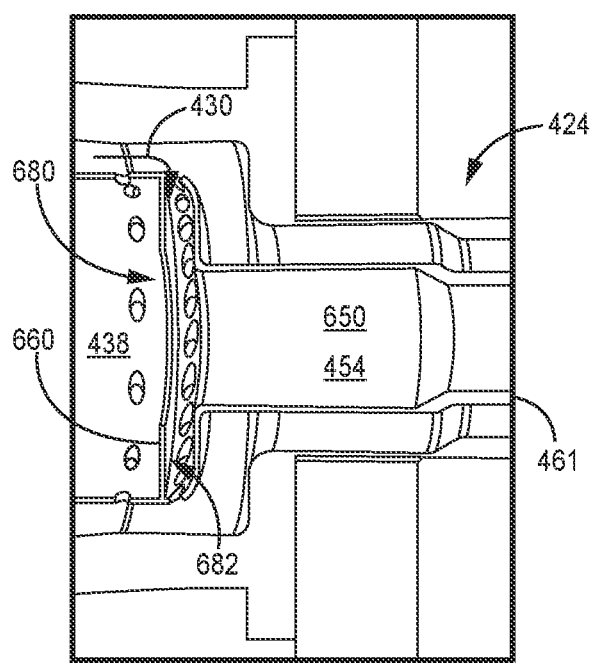
FIG. 7C shows an alternative example of a quenching system for a torch igniter.

FIG. 7C shows an example of a quenching system for torch igniter 410 that lacks mixing nozzle 448. In some applications, mixing nozzles 448 and 548 may be exposed to hot combustion cases and therefore the axially-extending portions of mixing nozzles 448 and 548 can experience unwanted thermal stress, potentially shortening their operational lifespan. Accordingly, in one embodiment, divider 660 of a quenching zone 650 has an aperture 680 that is able to communicate combustion gases from combustion chamber 438 to quenching zone 650 in lieu of mixing nozzle 448.

In examples of torch igniter 410 having aperture 680, quenching zone 650 extends axially from downstream face 682 of aperture 680 to downstream tip end 461. Aperture 680 has a circular cross section that is depicted as having a larger diameter than a diameter of outlet passage 454. However, it should be understood aperture 680 can have a diameter substantially the same as or smaller than the diameter of outlet passage 454, and further that aperture 680 can adopt any suitable shape for creating quenching zone 650 and channeling combustion gases from combustion chamber 438.

Figure 7D:
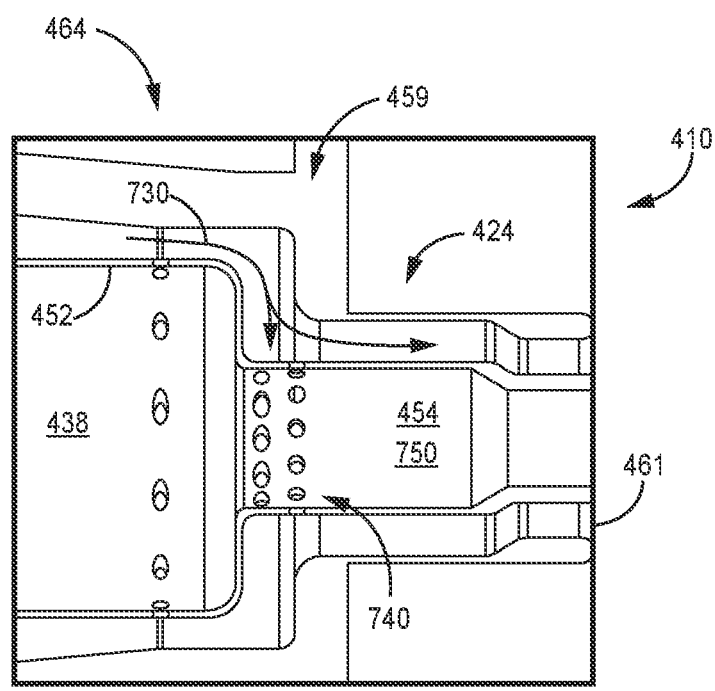
FIG. 7D shows an alternative example of a quenching system for a torch igniter.

FIG. 7D shows an alternative example of a quenching system for torch igniter 410. In this example, torch igniter 410 has quench holes 740 and quenching zone 750, and lacks divider 460 and mixing nozzle 448. Quench holes 740 function similarly to quench holes 440 and divert a portion of air flowing from inlet 416 toward tip region 424, as shown by arrows 730. Notably, quench holes 740 are extend through igniter wall 462 within tip region 424 rather than combustion section 464, as quench holes 440 are shown in FIG. 7A. This configuration allows for simplified construction of torch igniter 410. Air flowing through quench holes 740 can mix directly into gases exiting combustion chamber 438 into outlet passage 454. Quenching zone 750 is substantially co-spatial with outlet passage 454 and extends axially from quench holes 740 to downstream tip end 461. Consequently, quenching zone 750 can occupy a smaller volume than outlet passage 454, unlike quenching zone 450, which occupies a larger volume than outlet passage 454. Notably, while in the depicted example quench holes 740 are shown to be disposed in elbow region 459 near combustion chamber 438, they can be disposed at any suitable location in tip region 424 for cooling hot combustion gases passing through tip region 424.

In general, a torch igniter described herein can possess at least three distinct flow paths: (1) from inlets 162 to air swirl holes 170 and into combustion chamber 116; (2) from inlet 162 to metering holes 168 and into combustion chamber 116; and (3) from inlet 162 into a quenching zone, such as quenching zones 450, 650, or 750. In examples of a torch igniter lacking a quenching zone and therefore only possessing flow paths (1), and (2) the ratio of air flowing through flow paths (1) and (2) is approximately equal or 50/50. In examples of a torch igniter possessing all three flow paths, the ratio of air flowing through flow paths (1), (2), and (3) is approximately 25/25/50, respectively. While the torch igniters described herein are described generally as having three distinct flow paths, it should be understood that the torch igniters described herein can be configured to flow air through any suitable number of flow paths, including more than three flow paths. Further, the torch igniters herein can be configured to have fewer than three flow paths.

Advantageously, the cooling arrangements disclosed herein allow for torch igniters 10, 110, or 410 to be formed from only metallic materials. In particular, the helical geometry of helical channels 128 and helical outlets 164 possessed by torch igniter 110 substantially improves the cooling of igniter wall 138 by increasing the surface area available for cooling, allowing for the construction of torch igniter 110 entirely from metallic components. This eliminates the need for the use of, for example, ceramic materials to shield metal components of the hot combustion gases generated by the torch igniters disclosed herein. Notably, forming a torch igniter that does not include a mixture of ceramic and metallic materials eliminates the need for additional support structures or vibration isolation features within the torch igniters disclosed herein and facilitates construction of the torch igniters using additive manufacturing. The torch igniters disclosed herein also do not require seals between metallic and ceramic components, further reducing the likelihood of leakage of hot combustion gases or cooling airflow. Forming torch igniters 10, 110, or 410 as a monolithic structure further reduces the likelihood of leakage of hot combustion gases or cooling airflow.

In at least some examples, torch igniter 10, torch igniter 110, and torch igniter 410 are formed monolithically. More generally, all components of any torch igniter disclosed herein can be formed partially or entirely by additive manufacturing. For metal components (e.g., Inconel or other alloys) exemplary additive manufacturing processes include but are not limited to powder bed fusion techniques such as direct metal laser sintering (DMLS), laser net shape manufacturing (LNSM), electron beam manufacturing (EBM). Support-free additive manufacturing techniques, such as binder jetting, can also be used to form components of any torch igniter disclosed herein. Additive manufacturing is particularly useful in obtaining unique geometries (e.g., helical sections of channels 128 of torch igniter 110) and for reducing the need for welds or other attachments (e.g., between tip section 130, combustion section 132, and cap section 134 of torch igniter 110). However, other suitable manufacturing process can be used. For example, any or all of tip 30, combustion section 32, and cap 34 can be fabricated separately and joined via later manufacturing steps (e.g., brazing, welding, or compression fitting) to form torch igniter 10. Similarly, in some examples, tip section 130, combustion section 132, and cap section 134 can in some examples be fabricated separately and joined via later manufacturing steps to form torch igniter 110.

Discussion of Possible Embodiments

The following are non-exclusive descriptions of possible embodiments of the present invention.

An embodiment of a torch igniter for a combustor of a gas turbine engine includes a combustion chamber oriented about an axis, a cap defining an axially upstream end of the combustion chamber, a tip defining the axially downstream end of the combustion chamber, an igniter wall extending from the cap to the tip and defining a radial extent of the combustion chamber, a structural wall coaxial with and surrounding the igniter wall an outlet passage defined by the igniter wall within the tip, and a cooling system. The upstream and downstream ends of the combustion chamber define a flow direction through the combustion chamber along the axis, the cap is oriented about the axis and is configured to receive a fuel injector and a glow plug, and the outlet passage is fluidly connected to the combustion chamber. The cooling system includes an air inlet, a cooling channel forming a flow path between the igniter wall and the structural wall, and an aperture. The air inlet is formed within the structural wall and configured to intake a flow of air from a compressor section of the gas-turbine engine. The flow path has a first axial section, a second axial section, a radially inward section, and a radially outward section. The first axial section is adjacent to and directly fluidly connected to the air inlet and the radially inward section and is configured to direct the flow of air axially from the air inlet toward the tip. The radially inward section is adjacent to and directly fluidly connected to the first axial section and the radially outward section, and is configured to direct the flow of air toward the interior of the igniter tip. The radially outward section is adjacent to and directly fluidly connected to the second axial section and the radially inward section, and is configured to direct the flow of air toward the exterior of the igniter tip. The second axial section is configured to direct the flow of air toward the cap. The aperture extends transverse to the flow direction through the igniter wall, is adjacent to the second axial section, directly fluidly connects the second axial section to the combustion chamber.

The torch igniter of the preceding paragraph can optionally include, additionally and/or alternatively, any one or more of the following features, configurations and/or additional components:

A torch igniter for a combustor of a gas turbine engine according to an exemplary embodiment of this disclosure, among other possible things includes a combustion chamber oriented about an axis, a cap defining an axially upstream end of the combustion chamber, a tip defining the axially downstream end of the combustion chamber, an igniter wall extending from the cap to the tip and defining a radial extent of the combustion chamber, a structural wall coaxial with and surrounding the igniter wall an outlet passage defined by the igniter wall within the tip, and a cooling system. The upstream and downstream ends of the combustion chamber define a flow direction through the combustion chamber along the axis, the cap is oriented about the axis and is configured to receive a fuel injector and a glow plug, and the outlet passage is fluidly connected to the combustion chamber. The cooling system includes an air inlet, a cooling channel forming a flow path between the igniter wall and the structural wall, and an aperture. The air inlet is formed within the structural wall and configured to intake a flow of air from a compressor section of the gas-turbine engine. The flow path has a first axial section, a second axial section, a radially inward section, and a radially outward section. The first axial section is adjacent to and directly fluidly connected to the air inlet and the radially inward section and is configured to direct the flow of air axially from the air inlet toward the tip. The radially inward section is adjacent to and directly fluidly connected to the first axial section and the radially outward section, and is configured to direct the flow of air toward the interior of the igniter tip. The radially outward section is adjacent to and directly fluidly connected to the second axial section and the radially inward section, and is configured to direct the flow of air toward the exterior of the igniter tip. The second axial section is configured to direct the flow of air toward the cap. The aperture extends transverse to the flow direction through the igniter wall, is adjacent to the second axial section, directly fluidly connects the second axial section to the combustion chamber.

A further embodiment of the foregoing torch igniter, wherein the igniter wall is annular, a radius of the combustion chamber is greater than a radius of the outlet, and further comprising an elbow region in the combustion chamber adjacent to the tip.

A further embodiment of any of the foregoing torch igniters, further comprising a third axial section of the flow path.

A further embodiment of any of the foregoing torch igniters, wherein the third axial section is disposed between and directly fluidly connects the radially inward section and the radially outward section.

A further embodiment of any of the foregoing torch igniters, wherein the radially inward section is disposed at the downstream end of the tip, the third axial section directs the flow of air leaving the radially inward section toward the cap, and the radially outward section is embedded in the elbow region.

A further embodiment of any of the foregoing torch igniters, wherein at least one of the first axial section and the second axial section is helical.

A further embodiment of any of the foregoing torch igniters, wherein both of the first and second axial sections are helical and are composed of a plurality of subchannels forming a plurality of axially-extending helical flow paths along the torch igniter.

A further embodiment of any of the foregoing torch igniters, wherein the subchannels of the first and second axial sections are arranged in an alternating manner about the combustion chamber, such that the plurality of flow paths of the first axial section are arranged alternatingly with the plurality of flow paths of the second axial section.

A further embodiment of any of the foregoing torch igniters, wherein the torch igniter is monolithically formed by additive manufacturing.

A further embodiment of any of the foregoing torch igniters, wherein at least two portions of the torch igniter are each formed monolithically and attached by an additional manufacturing step.

A further embodiment of any of the foregoing torch igniters, wherein the aperture extends along a hole axis that is canted with respect to an interior surface of the igniter wall.

A further embodiment of any of the foregoing torch igniters, wherein the aperture is configured to flow air with a swirl relative to the axis.

A further embodiment of any of the foregoing torch igniters, further comprising a glow plug received by the cap.

A further embodiment of any of the foregoing torch igniters, wherein an innermost end of the glow plug extends into the combustion chamber, and an outermost end of the glow plug extends away from and is disposed outside of the combustion chamber.

A further embodiment of any of the foregoing torch igniters, wherein the aperture is disposed at a position upstream of the innermost end of the glow plug.

A further embodiment of any of the foregoing torch igniters, further comprising a metering hole disposed in the igniter wall at a position downstream of the innermost end of the glow plug that directly fluidly connects the cooling channel to the combustion chamber at a position in the flow path before the aperture.

A further embodiment of any of the foregoing torch igniters, wherein the metering hole is configured to divert a portion of the air flowing toward the aperture into the combustion chamber before it reaches the aperture.

A further embodiment of any of the foregoing torch igniters, wherein the igniter wall is annular and a radius of the combustion chamber is greater than a radius of the outlet passage, forming an elbow region in the combustion chamber adjacent to the tip.

A further embodiment of any of the foregoing torch igniters, wherein the metering hole is disposed in the elbow region.

A further embodiment of any of the foregoing torch igniters, wherein the cooling channel includes fins that extend transverse to the axis and are thermally connected to an interior of the torch igniter.

A further embodiment of any of the foregoing torch igniters, wherein the fins are configured to increase the surface area available for cooling.

A further embodiment of any of the foregoing torch igniters, wherein the fins split the channel into a plurality of subchannels forming a plurality of axially-extending helical flow paths along the torch igniter.

A further embodiment of any of the foregoing torch igniters, further comprising a quench hole disposed at a downstream location of the combustion chamber.

A further embodiment of any of the foregoing torch igniters, wherein the quench hole fluidly connects the first axial section to the outlet passage and is configured to divert a portion of the air flowing through the first axial section to the outlet passage to cool combustion gases flowing through the outlet passage.

A further embodiment of any of the foregoing torch igniters, wherein the tip is attached to a combustor, the outlet passage is fluidly connected to an interior volume of the combustor, and the flow of air taken in by the air inlet is located outside of the combustor.

A further embodiment of any of the foregoing torch igniters, wherein the cap, combustion chamber, and tip are oriented about an axis and the direction of flow is coaxial with the axis.

A embodiment of a method of cooling a torch igniter for a combustor in a gas turbine engine includes intaking a flow of air from a compressor section of the gas turbine engine, directing the flow of the air through a first axial section of a flow path, directing the air through a radially inward section of the flow path, directing the air through a radially outward section of the flow path, directing the air through a second axial section of the flow path, and flowing the air through an aperture into a combustion chamber of the torch igniter. The air is taken in at an air inlet formed in an exterior of a structural wall at a cap of the torch igniter. The structural wall is coaxial with and surrounds an igniter wall, the igniter wall defines a radial extent of the combustion chamber, the cap defines an axially upstream end of the combustion chamber, a tip defines an axially downstream end of the combustion chamber, and a cooling channel defines the flow path between the structural wall and the igniter wall. The first axial section of the flow path is adjacent to and directly fluidly connected to the air inlet and extends from the cap to the tip. The radially inward section is disposed near the tip and receives air from the first axial section. The radially outward section is disposed near the tip and receives air from the radially inward section. The second axial section directs the flow from the radially outward section toward the cap and extends from the tip to an aperture. The aperture extends through the igniter wall.

The method of the preceding paragraph can optionally include, additionally and/or alternatively, any one or more of the following features, configurations and/or additional components:

A method of cooling a torch igniter for a combustor in a gas turbine engine of a gas turbine engine according to an exemplary embodiment of this disclosure, among other possible things includes intaking a flow of air from a compressed air source, directing the flow of the air through a first axial section of a flow path, directing the air through a radially inward section of the flow path, directing the air through a radially outward section of the flow path, directing the air through a second axial section of the flow path, and flowing the air through an aperture into a combustion chamber of the torch igniter. The air is taken in at an air inlet formed in an exterior of a structural wall at a cap of the torch igniter. The structural wall is coaxial with and surrounds an igniter wall, the igniter wall defines a radial extent of the combustion chamber, the cap defines an axially upstream end of the combustion chamber, a tip defines an axially downstream end of the combustion chamber, and a cooling channel defines the flow path between the structural wall and the igniter wall. The first axial section of the flow path is adjacent to and directly fluidly connected to the air inlet and extends from the cap to the tip. The radially inward section is disposed near the tip and receives air from the first axial section. The radially outward section is disposed near the tip and receives air from the radially inward section. The second axial section directs the flow from the radially outward section toward the cap and extends from the tip to an aperture. The aperture extends through the igniter wall.

A further embodiment of the foregoing method, further comprising directing the radially inward flow of compressed air to flow axially toward the cap through a third axial section of the flow path before directing the flow of air to flow radially outward through the radially outward section.

A further embodiment of any of the foregoing methods, wherein the tip is attached to a combustor, the combustion chamber is in fluid communication with the combustor, and the flow of air is located outside of the combustor.

A further embodiment of any of the foregoing methods, wherein the igniter wall is annular and extends along an axis.

A further embodiment of any of the foregoing methods, wherein the first axial section, the second axial section, or both of the first and second axial sections extend helically along the axis.

A further embodiment of any of the foregoing methods, further comprising metering the flow of air to the aperture by diverting a portion of the flow through a metering hole into the combustion chamber before flowing the air through the aperture, wherein the metering hole extends through the igniter wall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A torch igniter for a combustor of a gas turbine engine, the torch igniter comprising:
   a combustion chamber oriented about an axis, the combustion chamber having axially upstream and downstream ends defining a flow direction through the combustion chamber, along the axis;
   a cap defining the axially upstream end of the combustion chamber and situated on the axis, wherein the cap is configured to receive a fuel injector and a glow plug;
   a tip defining the axially downstream end of the combustion chamber;
   an igniter wall extending from the cap to the tip and defining a radial extent of the combustion chamber;
   a structural wall coaxial with and surrounding the igniter wall;
   an outlet passage defined by the igniter wall within the tip, wherein the outlet passage fluidly connects the combustion chamber to the combustor of the gas turbine engine; and
   a cooling system comprising:
      an air inlet formed within the structural wall and configured to intake a flow of air from a compressed air source;
      a cooling channel forming a flow path between the igniter wall and the structural wall, wherein the flow path comprises a first axial section, a second axial section, a radially inward section, a radially outward section, and a third axial section, the third axial section disposed between and directly fluidly connecting the radially inward section and the radially outward section;
      an aperture extending transverse to the flow direction through the igniter wall, wherein the aperture is adjacent to the second axial section and directly fluidly connects the second axial section to the combustion chamber; and
      a quench hole disposed at a downstream location of the combustion chamber, wherein the quench hole fluidly connects the cooling channel to the outlet passage and is configured to divert a portion of the air flowing through the cooling channel to the outlet passage to cool combustion gases flowing through the outlet passage;
   wherein:
      the first axial section is adjacent to and directly fluidly connected to the air inlet and the radially inward section and is configured to direct the flow of the air axially from the air inlet toward the tip;

the radially inward section is adjacent to and directly fluidly connected to the first axial section, and is configured to direct the flow of the air toward an interior of the igniter tip;

the radially outward section is adjacent to and directly fluidly connected to the second axial section, and is configured to direct the flow of the air toward an exterior of the igniter tip; and the second axial section is configured to direct the flow of the air toward the cap.

2. The torch igniter of claim 1, further comprising an annular divider centered on the axis and disposed at the axially downstream end of the combustion chamber at a position upstream of the quench hole, wherein the annular divider is configured to form a quenching zone that is at least partially co-spatial with the outlet passage.

3. The torch igniter of claim 2, wherein the quench hole is configured to divert the portion of the air to the quenching zone.

4. The torch igniter of claim 2, and further comprising a mixing nozzle attached to and extending away from a downstream face of the annular divider, wherein the mixing nozzle is configured to mix the combustion gases formed in the combustion chamber with the air from the quench hole.

5. The torch igniter of claim 4, wherein the mixing nozzle is attached to and extends away from a center of the annular divider.

6. The torch igniter of claim 4, wherein the mixing nozzle is annular.

7. The torch igniter of claim 4, wherein a downstream end of the mixing nozzle comprises:
a plurality of protrusions distributed symmetrically about the axis; and
a plurality of indentations distributed symmetrically about the axis;
wherein:
a first diameter between diametrically-opposed protrusions is greater than a second diameter between diametrically-opposed indentations.

8. The torch igniter of claim 7, wherein an upstream end of the mixing nozzle is annular.

9. The torch igniter of claim 1, wherein:
the igniter wall is annular, a radius of the combustion chamber is greater than a radius of the outlet, forming an elbow region in the combustion chamber adjacent to the tip; and
the quench hole is disposed in the elbow region.

10. The torch igniter of claim 1, wherein the igniter wall is annular, a radius of the combustion chamber is greater than a radius of the outlet passage, and further comprising an elbow region in the combustion chamber adjacent to the tip.

11. The torch igniter of claim 1, wherein the radially inward section is disposed at a downstream end of the tip, the third axial section directs the flow of the air leaving the radially inward section toward the cap, and the radially outward section is embedded in the elbow region.

12. The torch igniter of claim 1, wherein both of the first and second axial sections are helical and are composed of a plurality of subchannels forming a plurality of axially-extending helical flow paths along the torch igniter.

13. The torch igniter of claim 12, wherein the subchannels of the first and second axial sections are arranged in a circumferentially alternating manner about the combustion chamber, such that the plurality of flow paths of the first axial section are arranged alternatingly with the plurality of flow paths of the second axial section.

14. The torch igniter of claim 1, wherein the aperture extends along a hole axis that is canted with respect to an interior surface of the igniter wall.

15. The torch igniter of claim 1, wherein the cooling channel includes fins that extend transverse to the axis.

16. The torch igniter of claim 1, and further comprising the glow plug received by the cap, wherein:
an innermost end of the glow plug extends into the combustion chamber and an outermost end of the glow plug extends away from and is disposed outside of the combustion chamber; and
the aperture is disposed at a position upstream of the innermost end of the glow plug.

17. The torch igniter of claim 16, and further comprising:
a metering hole disposed in the igniter wall at a position downstream of the innermost end of the glow plug that directly fluidly connects the cooling channel to the combustion chamber at a position in the flow path before the aperture, wherein the metering hole is configured to divert a portion of the air flowing toward the aperture into the combustion chamber before the air reaches the aperture.

18. A torch igniter for a combustor of a gas turbine engine, the torch igniter comprising:
a combustion chamber oriented about an axis, the combustion chamber having axially upstream and downstream ends defining a flow direction through the combustion chamber, along the axis;
a cap defining the axially upstream end of the combustion chamber and situated on the axis, wherein the cap is configured to receive a fuel injector and a glow plug;
a tip defining the axially downstream end of the combustion chamber;
an igniter wall extending from the cap to the tip and defining a radial extent of the combustion chamber;
a structural wall coaxial with and surrounding the igniter wall;
an outlet passage defined by the igniter wall within the tip, wherein the outlet passage fluidly connects the combustion chamber to the combustor of the gas turbine engine; and
a cooling system comprising:
an air inlet formed within the structural wall and configured to intake a flow of air from a compressed air source;
a cooling channel forming a flow path between the igniter wall and the structural wall, wherein: the flow path comprises a first axial section, a second axial section, a radially inward section, and a radially outward section; and both of the first and second axial sections are helical and are composed of a plurality of subchannels forming a plurality of axially-extending helical flow paths along the torch igniter;
an aperture extending transverse to the flow direction through the igniter wall, wherein the aperture is adjacent to the second axial section and directly fluidly connects the second axial section to the combustion chamber; and
a quench hole disposed at a downstream location of the combustion chamber, wherein the quench hole fluidly connects the cooling channel to the outlet passage and is configured to divert a portion of the air flowing through the cooling channel to the outlet passage to cool combustion gases flowing through the outlet passage;

wherein:
the first axial section is adjacent to and directly fluidly connected to the air inlet and the radially inward section and is configured to direct the flow of the air axially from the air inlet toward the tip;

the radially inward section is adjacent to and directly fluidly connected to the first axial section, and is configured to direct the flow of the air toward an interior of the igniter tip;

the radially outward section is adjacent to and directly fluidly connected to the second axial section, and is configured to direct the flow of the air toward an exterior of the igniter tip; and the second axial section is configured to direct the flow of the air toward the cap.

19. A torch igniter for a combustor of a gas turbine engine, the torch igniter comprising:

a combustion chamber oriented about an axis, the combustion chamber having axially upstream and downstream ends defining a flow direction through the combustion chamber, along the axis;

a cap defining the axially upstream end of the combustion chamber and situated on the axis, wherein the cap is configured to receive a fuel injector and a glow plug;

a tip defining the axially downstream end of the combustion chamber;

an igniter wall extending from the cap to the tip and defining a radial extent of the combustion chamber;

a structural wall coaxial with and surrounding the igniter wall;

an outlet passage defined by the igniter wall within the tip, wherein the outlet passage fluidly connects the combustion chamber to the combustor of the gas turbine engine;

a cooling system comprising:
an air inlet formed within the structural wall and configured to intake a flow of air from a compressed air source;
a cooling channel forming a flow path between the igniter wall and the structural wall;
an aperture extending transverse to the flow direction through the igniter wall, wherein the aperture is adjacent to the second axial section and directly fluidly connects the second axial section to the combustion chamber; and
a quench hole disposed at a downstream location of the combustion chamber, wherein the quench hole fluidly connects the cooling channel to the outlet passage and is configured to divert a portion of the air flowing through the cooling channel to the outlet passage to cool combustion gases flowing through the outlet passage;

an annular divider centered on the axis and disposed at the axially downstream end of the combustion chamber at a position upstream of the quench hole, wherein the annular divider is configured to form a quenching zone that is at least partially co-spatial with the outlet passage; and a mixing nozzle attached to and extending away from a downstream face of the annular divider, wherein:

the mixing nozzle is configured to mix the combustion gases formed in the combustion chamber with the air from the quench hole;

a downstream end of the mixing nozzle comprises:
a plurality of protrusions distributed symmetrically about the axis; and
a plurality of indentations distributed symmetrically about the axis; and a first diameter between diametrically-opposed protrusions is greater than a second diameter between diametrically-opposed indentations.

* * * * *